(12) United States Patent
Sasaki et al.

(10) Patent No.: US 11,410,688 B1
(45) Date of Patent: Aug. 9, 2022

(54) THERMALLY-ASSISTED MAGNETIC RECORDING HEAD HAVING PLASMON GENERATOR OF MULTIPLE METAL LAYERS

(71) Applicants: Yoshitaka Sasaki, Los Gatos, CA (US); Hiroyuki Ito, Milpitas, CA (US); Shigeki Tanemura, Milpitas, CA (US); Hironori Araki, Milpitas, CA (US); Yoji Nomura, Milpitas, CA (US); Yukinori Ikegawa, Milpitas, CA (US); Weihao Xu, Milpitas, CA (US)

(72) Inventors: Yoshitaka Sasaki, Los Gatos, CA (US); Hiroyuki Ito, Milpitas, CA (US); Shigeki Tanemura, Milpitas, CA (US); Hironori Araki, Milpitas, CA (US); Yoji Nomura, Milpitas, CA (US); Yukinori Ikegawa, Milpitas, CA (US); Weihao Xu, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/347,992

(22) Filed: Jun. 15, 2021

(51) Int. Cl.
| | |
|---|---|
| *G11B 11/105* | (2006.01) |
| *G11B 5/127* | (2006.01) |
| *G11B 7/1387* | (2012.01) |
| *G11B 5/60* | (2006.01) |
| G11B 5/00 | (2006.01) |
| G11B 5/48 | (2006.01) |

(52) U.S. Cl.
CPC .......... *G11B 5/1278* (2013.01); *G11B 5/6088* (2013.01); *G11B 7/1387* (2013.01); *G11B 5/4866* (2013.01); *G11B 11/105* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 8,705,327 | B2 | 4/2014 | Matsumoto | |
| 8,711,663 | B1 * | 4/2014 | Sasaki | G11B 5/6088 369/13.13 |
| 8,760,809 | B1 * | 6/2014 | Sasaki | G11B 5/6088 360/125.31 |
| 8,830,799 | B1 * | 9/2014 | Sasaki | G02B 5/008 369/13.33 |
| 8,861,138 | B2 * | 10/2014 | Sasaki | B23K 10/00 360/125.31 |
| 8,867,170 | B1 * | 10/2014 | Sasaki | G11B 5/6088 360/125.3 |

(Continued)

*Primary Examiner* — Tan X Dinh
(74) *Attorney, Agent, or Firm* — Oliff PLC

(57) ABSTRACT

A thermally-assisted magnetic recording head includes a medium facing surface, a main pole, a waveguide, and a plasmon generator. A second metal layer of the plasmon generator includes a second front end facing the medium facing surface. A third metal layer of the plasmon generator includes a narrow portion located on the second metal layer. The narrow portion includes a front end face located in the medium facing surface and configured to generate near-field light from a surface plasmon, and a rear end opposite the front end face. The rear end is located farther from the medium facing surface than is the second front end.

15 Claims, 30 Drawing Sheets

(56) References Cited

U.S. PATENT DOCUMENTS

| | | | | |
|---|---|---|---|---|
| 8,988,975 B1* | 3/2015 | Sasaki | .................. | G11B 5/3116 |
| | | | | 369/13.13 |
| 9,208,806 B2* | 12/2015 | Sasaki | .................. | G02B 6/1226 |
| 9,236,082 B2* | 1/2016 | Sasaki | .................... | G11B 9/12 |
| 9,472,230 B1 | 10/2016 | Sasaki et al. | | |
| 9,741,377 B1 | 8/2017 | Sasaki et al. | | |
| 9,812,156 B2* | 11/2017 | Sasaki | .................... | G11B 5/127 |
| 10,978,102 B1* | 4/2021 | Lai | ...................... | G11B 5/6088 |
| 11,049,516 B1* | 6/2021 | Ikegawa | .............. | G11B 5/1875 |
| 11,114,119 B1* | 9/2021 | Sasaki | ................. | G11B 5/4866 |
| 2014/0269237 A1* | 9/2014 | Sasaki | ................. | G11B 5/3133 |
| | | | | 219/121.36 |

* cited by examiner

THERMALLY-ASSISTED MAGNETIC RECORDING HEAD HAVING PLASMON GENERATOR OF MULTIPLE METAL LAYERS

BACKGROUND OF THE INVENTION

1. Field of the Invention

The present invention relates to a thermally-assisted magnetic recording head for use in thermally-assisted magnetic recording to write data on a recording medium with the coercivity thereof lowered by applying near-field light thereto.

2. Description of the Related Art

With recent increases in recording density of magnetic recording devices such as magnetic disk drives, there has been demand for improved performance of thin-film magnetic heads and recording media. Among the thin-film magnetic heads, a composite thin-film magnetic head has been used widely. The composite thin-film magnetic head has such a structure that a read head unit including a magnetoresistive element (hereinafter, also referred to as MR element) for reading and a recording head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium.

To increase the recording density of a magnetic recording device, it is effective to make the magnetic fine particles of the recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the recording medium, thereby making it difficult to perform data writing with existing magnetic heads.

As a solution to the problems described above, there has been proposed a technology called thermally-assisted magnetic recording. The technology uses a recording medium having high coercivity. When writing data, a write magnetic field and heat are applied almost simultaneously to the area of the recording medium where to write data, so that the area rises in temperature and drops in coercivity for data writing. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically emitted from a laser diode mounted on the slider, and is guided, by a waveguide provided in the slider, to the plasmon generator disposed near the medium facing surface of the slider.

U.S. Pat. Nos. 8,760,809 B1 and 9,741,377 B2 each disclose a thermally-assisted magnetic recording head including a main pole, a waveguide, and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

To increase the recording density, the width and thickness of the plasmon generator in the medium facing surface need to be reduced.

In a thermally-assisted magnetic recording head, heat generated by the plasmon generator causes the plasmon generator to get hot. This results in the problem of deformation or breakage of the plasmon generator, thus shortening the life of the thermally-assisted magnetic recording head. In particular, such a problem becomes pronounced as the width and thickness of the plasmon generator in the medium facing surface decrease.

One of solutions to the aforementioned problem is to construct the plasmon generator to include a first metal portion and a second metal portion that are formed of mutually different metal materials, as disclosed in U.S. Pat. No. 9,754,614 B1. The first metal portion has a front end that is closest to the medium facing surface and is located at a distance from the medium facing surface. The second metal portion has an end face located in the medium facing surface. The first metal portion further has a plasmon exciting section to excite surface plasmons thereon. The surface plasmons excited on the plasmon exciting section propagate to the end face of the second metal portion located in the medium facing surface, and near-field light is generated from those excited surface plasmons at the end face of the second metal portion.

A metal suitable for excitation and propagation of surface plasmons, that is, a metal having high electrical conductivity such as Au or Ag is selected as the metal material to form the first metal portion. As the metal material to form the second metal portion, selected is one having higher hardness than the metal material used for the first metal portion. This can prevent the second metal portion from being deformed or broken.

However, the plasmon generator including the aforementioned first and second metal portions has a problem in that the heat generated at the second metal portion is transferred to the first metal portion to cause the first metal portion to get hot, and can thus deform the first metal portion such that its front end gets farther from the medium facing surface.

As disclosed in FIG. 35 and the like of U.S. Pat. No. 9,741,377 B1, there has been known a second metal portion that includes a narrow portion including the end face of the second metal portion and a wide portion connected to the narrow portion. The wide portion has a maximum width greater than that of the narrow portion in the track width direction. To improve the life of the plasmon generator, the length of the narrow portion in a direction perpendicular to the medium facing surface is desirably reduced. However, the width of the narrow portion in the track width direction typically increases near the wide portion. Reducing the length of the narrow portion therefore causes a problem of substantially increasing the width of the narrow portion, thereby spreading the near-field light. It has thus been difficult to improve the life of the plasmon generator including the second metal portion of the foregoing structure, and the linear recording density as well.

SUMMARY OF THE INVENTION

An object of the present invention is to provide a thermally-assisted magnetic recording head including a plasmon generator that has high reliability and can increase the recording density.

A thermally-assisted magnetic recording head according to the present invention includes: a medium facing surface configured to face a recording medium; a main pole configured to produce a write magnetic field for writing data on the recording medium; a waveguide including a core configured to allow light to propagate therethrough and a cladding located around the core; and a plasmon generator. The plasmon generator includes a first metal layer, a second metal layer, and a third metal layer. The first metal layer is formed of a first metal material, is located away from the medium facing surface, and includes a plasmon exciting portion configured to excite a surface plasmon thereon based on the light propagating through the core and a first front end facing the medium facing surface. The second metal layer is formed of a second metal material, is located on the first metal layer at a distance from the medium facing surface, and includes a second front end facing the medium facing surface. The third metal layer is formed of the second metal material and located on the second metal layer.

The third metal layer includes a narrow portion located on the second metal layer. The narrow portion includes a front end face that is located in the medium facing surface, and a rear end opposite the front end face. The front end face is configured to generate near-field light from the surface plasmon. The second metal layer has a maximum width greater than that of the narrow portion of the third metal layer in a track width direction. The rear end of the narrow portion of the third metal layer is located farther from the medium facing surface than is the second front end of the second metal layer.

In the thermally-assisted magnetic recording head according to the present invention, the first metal material may contain Au. The second metal material may be Pt, Rh, Ir, a PtAu alloy, a PtRh alloy, an RhAu alloy, or a PtIr alloy.

In the thermally-assisted magnetic recording head according to the present invention, the second metal layer may include a first wide portion. In such a case, the third metal layer may further include a second wide portion located on the first wide portion of the second metal layer at a position farther from the medium facing surface than is the narrow portion of the third metal layer. The second wide portion of the third metal layer may be connected to the rear end of the narrow portion of the third metal layer and may have a maximum width greater than that of the narrow portion of the third metal layer in the track width direction. An outer edge of a planar shape of the second wide portion of the third metal layer may be located along an outer edge of a planar shape of the first wide portion of the second metal layer.

In the thermally-assisted magnetic recording head according to the present invention, the narrow portion of the third metal layer may be a first narrow portion of the third metal layer. In such a case, the second metal layer may include a wide portion and a second narrow portion located between the medium facing surface and the wide portion at a distance from the medium facing surface. The second narrow portion may include a second front end. In an arbitrary cross section parallel to the medium facing surface, a width of the second narrow portion of the second metal layer in the track width direction may be greater than that of the first narrow portion of the third metal layer in the track width direction.

In the thermally-assisted magnetic recording head according to the present invention, at least part of the first front end of the first metal layer may be located farther from the medium facing surface than is the second front end of the second metal layer. In such a case, the second metal layer may include a first wide portion. The third metal layer may further include a second wide portion located on the first wide portion of the second metal layer at a position farther from the medium facing surface than is the narrow portion of the third metal layer. The second wide portion of the third metal layer may be connected to the rear end of the narrow portion of the third metal layer and may have a maximum width greater than that of the narrow portion of the third metal layer in the track width direction. An outer edge of a planar shape of the second wide portion of the third metal layer may be located along an outer edge of a planar shape of the first wide portion of the second metal layer.

If at least part of the first front end of the first metal layer is located farther from the medium facing surface than is the second front end of the second metal layer, the narrow portion of the third metal layer may be a first narrow portion of the third metal layer. The second metal layer may include a wide portion and a second narrow portion located between the medium facing surface and the wide portion at a distance from the medium facing surface. The second narrow portion may include a second front end. In an arbitrary cross section parallel to the medium facing surface, a width of the second narrow portion of the second metal layer in the track width direction may be greater than that of the first narrow portion of the third metal layer in the track width direction.

In the thermally-assisted magnetic recording head according to the present invention, the narrow portion of the third metal layer may further include a bottom surface in contact with the second metal layer and a top surface opposite the bottom surface. The top surface may include an inclined portion inclined relative to a direction perpendicular to the medium facing surface.

In the thermally-assisted magnetic recording head according to the present invention, at least part of the narrow portion of the third metal layer may have a constant width in the track width direction regardless of distance from the medium facing surface. Alternatively, the width of at least part of the narrow portion of the third metal layer in the track width direction may decrease with decreasing distance to the medium facing surface.

A thermally-assisted magnetic recording head manufactured by a manufacturing method according to the present invention includes a medium facing surface configured to face a recording medium, a main pole configured to produce a write magnetic field for writing data on the recording medium, a waveguide including a core configured to allow light to propagate therethrough and a cladding located around the core, and a plasmon generator. The plasmon generator include a first metal layer, a second metal layer, and a third metal layer. The first metal layer is formed of a first metal material, is located away from the medium facing surface, and includes a plasmon exciting portion configured to excite a surface plasmon thereon based on the light propagating through the core and a first front end facing the medium facing surface. The second metal layer is formed of a second metal material, is located on the first metal layer at a distance from the medium facing surface, and includes a second front end facing the medium facing surface. The third metal layer is formed of the second metal material and located on the second metal layer.

The third metal layer includes a narrow portion located on the second metal layer. The narrow portion includes a front end face that is located in the medium facing surface, and a rear end opposite the front end face. The front end face is configured to generate near-field light from the surface plasmon. The second metal layer has a maximum width greater than that of the narrow portion of the third metal layer in a track width direction. The rear end of the narrow portion of the third metal layer is located farther from the medium facing surface than is the second front end of the second metal layer. At least part of the first front end of the first metal layer is located farther from the medium facing surface than is the second front end of the second metal layer.

The manufacturing method for the thermally-assisted magnetic recording head according to the present invention includes the steps of forming the main pole, forming the waveguide, and forming the plasmon generator. The step of forming the plasmon generator includes the steps of forming the first metal layer and the second metal layer, and forming the third metal layer. The step of forming the first metal layer and the second metal layer includes a step of forming a first metal film of the first metal material, a step of forming a second metal film of the second metal material on the first metal film, a first etching step of etching part of the first metal film near a location where the medium facing surface is to be formed, after the formation of the second metal film, and a second etching step of etching the first metal film and the second metal film so that the first metal film and the second metal film make the first metal layer and the second metal layer, respectively.

In the manufacturing method for the thermally-assisted magnetic recording head according to the present invention, an outer edge of a planar shape of the second metal layer may be located along an outer edge of a planar shape of the first metal layer.

In the manufacturing method for the thermally-assisted magnetic recording head according to the present invention, the step of forming the third metal layer may be performed after the first etching step and before the second etching step.

In the manufacturing method for the thermally-assisted magnetic recording head according to the present invention, the second metal layer may include a first wide portion. In such a case, the third metal layer may further include a second wide portion located on the first wide portion of the second metal layer at a position farther from the medium facing surface than is the narrow portion of the third metal layer. The second wide portion of the third metal layer may be connected to the rear end of the narrow portion of the third metal layer and may have a maximum width greater than that of the narrow portion of the third metal layer in the track width direction. An outer edge of a planar shape of the second wide portion of the third metal layer may be located along an outer edge of a planar shape of the first wide portion of the second metal layer.

In the manufacturing method for the thermally-assisted magnetic recording head according to the present invention, the narrow portion of the third metal layer may be a first narrow portion of the third metal layer. In such a case, the second metal layer may include a wide portion and a second narrow portion located between the medium facing surface and the wide portion at a distance from the medium facing surface. The second narrow portion may include a second front end. In an arbitrary cross section parallel to the medium facing surface, a width of the second narrow portion of the second metal layer in the track width direction may be greater than a width of the first narrow portion of the third metal layer in the track width direction.

According to the thermally-assisted magnetic recording head of the present invention, a plasmon generator that has high reliability and can increase recording density can be implemented.

Other and further objects, features and advantages of the present invention will appear more fully from the following description.

DETAILED DESCRIPTION OF THE PREFERRED EMBODIMENTS

First Embodiment

Figure 5:
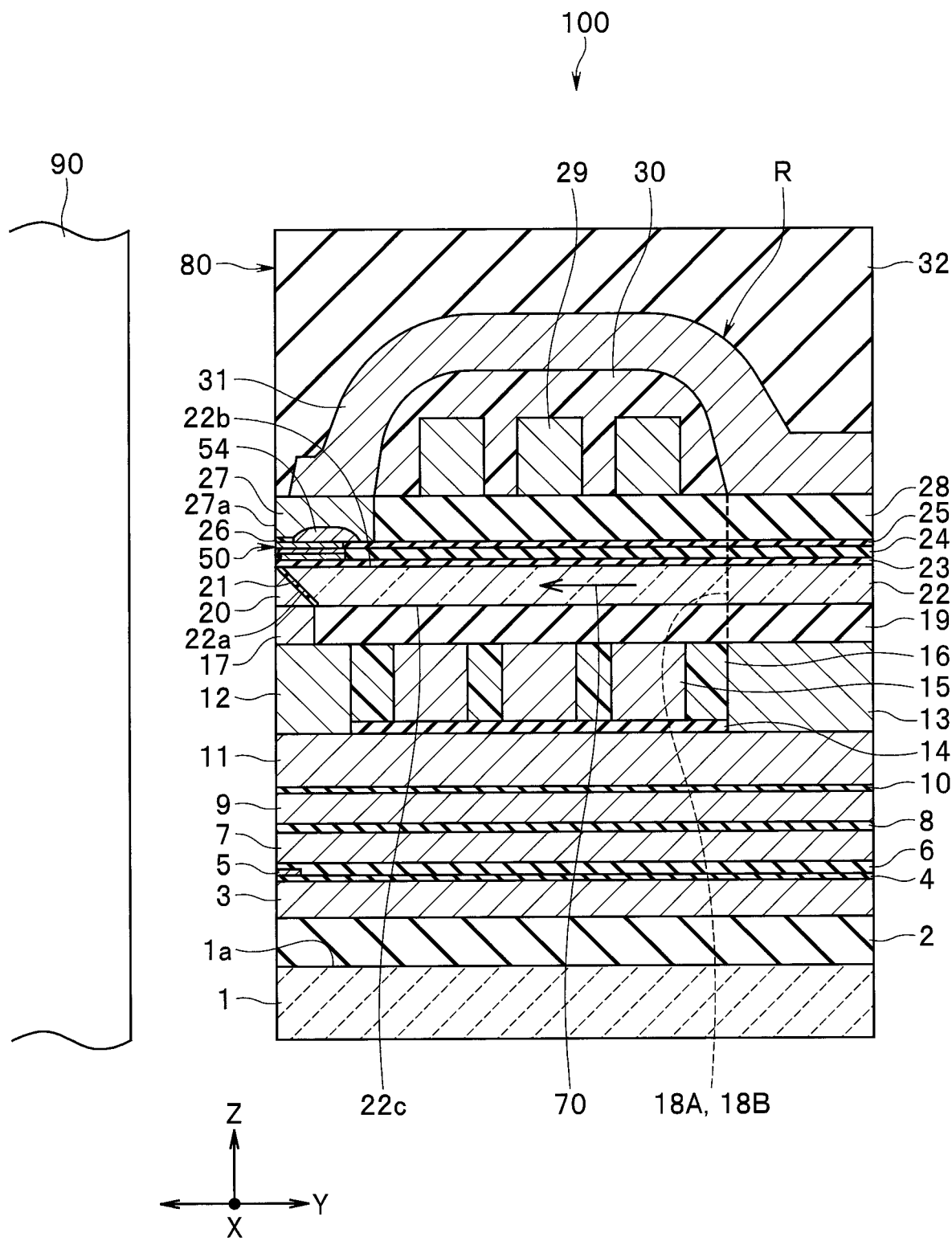
FIG. 5 is a cross-sectional view showing the configuration of the thermally-assisted magnetic recording head according to the first embodiment of the invention.
Figure 6:
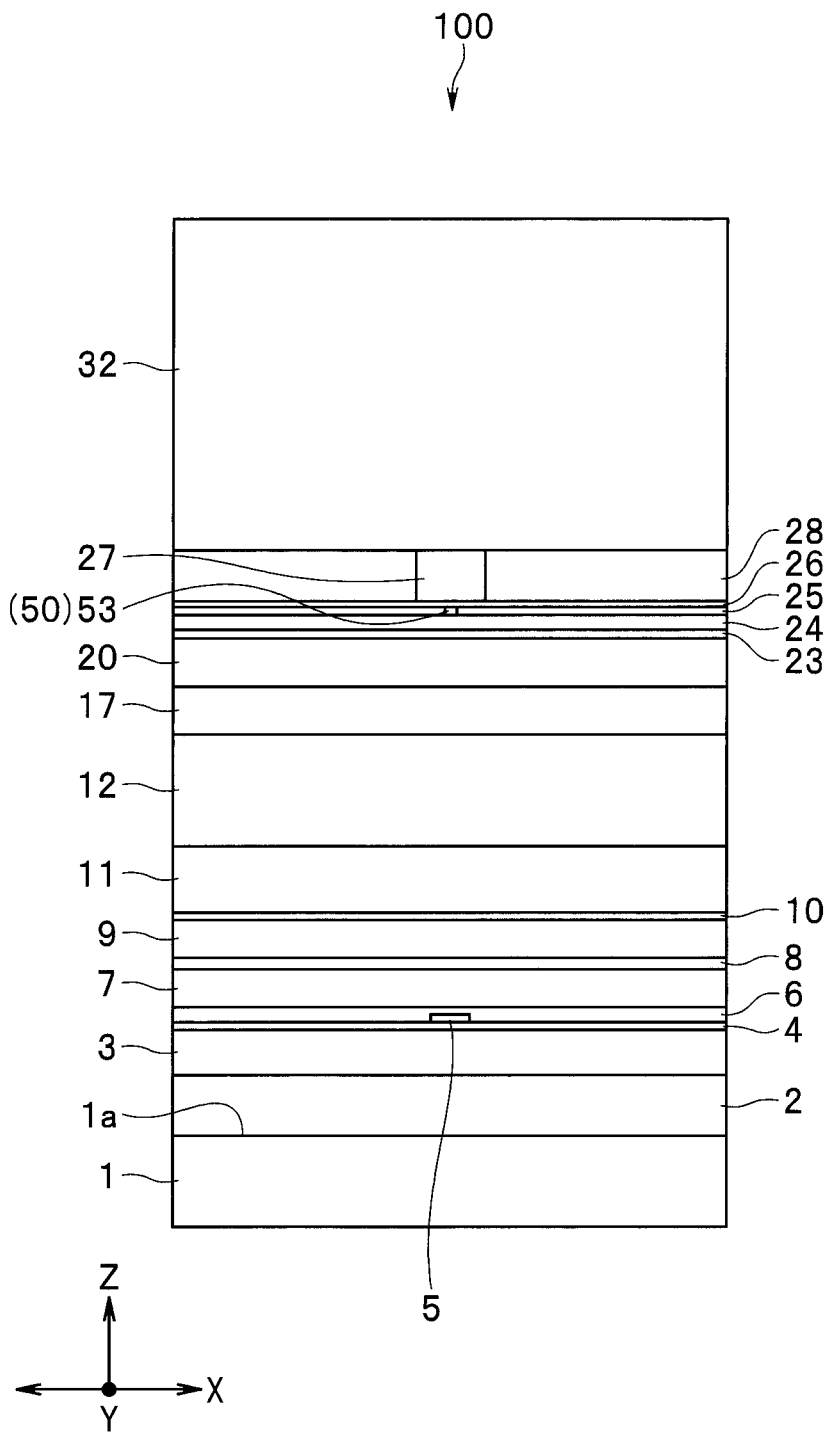
FIG. 6 is a front view showing a medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe a configuration of a thermally-assisted magnetic recording head according to a first embodiment of the invention. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head 100 according to the present embodiment is intended for use in perpendicular magnetic recording, and is incorporated in a slider configured to fly over the surface of a rotating recording medium 90. The slider has a medium facing surface 80 configured to face a recording medium 90. When the recording medium 90 rotates, an airflow passing between the recording medium 90 and the slider causes a lift to be exerted on the slider. The lift causes the slider to fly over the surface of the recording medium 90.

As shown in FIG. 5, the thermally-assisted magnetic recording head 100 has the medium facing surface 80. Here, we define X direction, Y direction, and Z direction as follows. The X direction corresponds to the direction of track width of the recording medium 90. The Y direction is a direction perpendicular to the medium facing surface 80. The Z direction corresponds to the direction of track length of the recording medium 90, and is the direction of travel of the recording medium 90 as viewed from the slider. The X, Y, and Z directions are orthogonal to one another.

As shown in FIG. 5 and FIG. 6, the thermally-assisted magnetic recording head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

For the positions of components of the thermally-assisted magnetic recording head 100, the term above as used herein refers to positions located in a direction that is parallel to the Z direction and away from the top surface 1a with respect to a reference position, and below refers to positions located in a direction that is parallel to the Z direction and toward the top surface 1a with respect to the reference position. For the surfaces of the components of the thermally-assisted magnetic recording head 100, the term top surface as used herein refers to the surface farthest from the top surface 1a, and bottom surface refers to the surface closest to the top surface 1a.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head 100 further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a recording head unit disposed on the nonmagnetic layer 10. The middle shield layer 9 has the function of shielding the MR element 5 from magnetic fields generated in the recording head unit. The insulating layer 8 and the nonmagnetic layer 10 are formed of alumina, for example.

The recording head unit includes coils 15 and 29 and a main pole 27. The coils 15 and 29 each produce a magnetic field corresponding to data to be written on the recording medium 90. As shown in FIG. 5, the main pole 27 has a front end face 27a located in the medium facing surface 80. The main pole 27 is configured to pass a magnetic flux corresponding to the magnetic field produced by the coils 15 and 29, and to produce from the front end face 27a a write magnetic field for use to write data on the recording medium 90 by means of a perpendicular magnetic recording system. The coils 15 and 29 are formed of a conductive material such as copper. The main pole 27 is formed of a magnetic material.

The recording head unit further includes a shield 20. The shield 20 is formed of a magnetic metal. The shield 20 has an end face located in the medium facing surface 80.

The recording head unit further includes a return path section R formed of a magnetic material. The return path section R connects the main pole 27 and the shield 20 to each other, and passes a magnetic flux corresponding to the magnetic field produced by each of the coils 15 and 29. The return path section R includes a return pole layer 11, coupling layers 12, 13 and 17, two coupling sections 18A and 18B, and a yoke layer 31. The return pole layer 11 lies on the nonmagnetic layer 10. The return pole layer 11 has an end face located in the medium facing surface 80. The recording head unit further includes an unshown insulating layer provided around the return pole layer 11. The unshown insulating layer is formed of alumina, for example.

The coupling layer 12 lies on a first portion of the top surface of the return pole layer 11, the first portion being near the medium facing surface 80. The coupling layer 13 lies on a second portion of the top surface of the return pole layer 11, the second portion being located away from the medium facing surface 80. The coupling layer 12 has an end face located in the medium facing surface 80. The recording head unit further includes an insulating layer 14 lying on the unshown insulating layer and a portion of the top surface of the return pole layer 11 other than the first and second portions. The insulating layer 14 is formed of alumina, for example.

The coil 15 lies on the insulating layer 14. The coil 15 is wound around the coupling layer 13. The recording head unit further includes an insulating layer 16 and an unshown insulating layer. The insulating layer 16 is located between the windings of the coil 15. The unshown insulating layer is located around the coupling layer 12 and the coil 15. The insulating layer 16 is formed of photoresist, for example. The unshown insulating layer is formed of alumina, for example.

The coupling layer 17 lies on the coupling layer 12. The shield 20 is disposed on the coupling layer 17. Each of the coupling sections 18A and 18B has a first layer lying on the coupling layer 13, and a second and a third layer stacked in this order on the first layer. The first layer of the coupling section 18A and the first layer of the coupling section 18B are arranged to be adjacent in the track width direction (the X direction).

The recording head unit further includes a waveguide including a core 22 and a cladding, the core 22 allowing light to propagate therethrough, the cladding being provided around the core 22. The core 22 has an end face 22a facing toward the medium facing surface 80, an evanescent light generating surface 22b which is a top surface, a bottom surface 22c, and two side surfaces. The end face 22a is inclined such that the distance between the medium facing surface 80 and the end face 22a decreases with increasing distance between the end face 22a and the top surface 1a of the substrate 1.

The cladding includes cladding layers 19, 21, and 23, and a surrounding cladding layer (not shown). The cladding layer 19 is located on the coupling layers 12 and 13, the coil 15, and the insulating layer 16, around the coupling layer 17. The first layers of the coupling sections 18A and 18B are embedded in the cladding layer 19.

The core 22 lies on the cladding layer 19. The cladding layer 21 is interposed between the shield 20 and the core 22. The surrounding cladding layer lies on the cladding layer 19 and surrounds the core 22. The cladding layer 23 lies on the evanescent light generating surface 22b of the core 22 and the top surface of the surrounding cladding layer.

The second layers of the coupling sections 18A and 18B are embedded in the surrounding cladding layer. The second layer of the coupling section 18A and the second layer of the coupling section 18B are located on opposite sides of the core 22 in the direction of track width (the X direction) and spaced from the core 22.

The core 22 is formed of a dielectric material that transmits laser light to be used for generating near-field light. The laser light emitted from an unshown laser diode enters the core 22 and propagates through the core 22. The cladding is formed of a dielectric material that has a refractive index lower than that of the core 22. Examples of the material of the core 22 include tantalum oxide ($TaO_x$) and niobium oxide ($NbO_x$). Here, x represents an arbitrary number greater than 0. Examples of the material of the cladding include silicon oxide ($SiO_2$) and alumina.

The recording head unit further includes a plasmon generator 50. The plasmon generator 50 is configured to excite surface plasmons thereon on the principle to be described later. The plasmon generator 50 has a front end face located in the medium facing surface 80. The plasmon generator 50 is configured so that surface plasmons are excited from the light propagating through the core 22 and near-field light is generated at the front end face of the plasmon generator 50 from the surface plasmons.

The recording head unit further includes a dielectric layer 24 located on the cladding layer 23 around a part of the plasmon generator 50, a dielectric layer 25 located on the dielectric layer 24 around another part of the plasmon generator 50, a dielectric layer 26 located on the plasmon generator 50 and the dielectric layer 24 near the medium facing surface 80, and a heat sink 54 located on the plasmon generator 50 and the dielectric layer 25 at a distance from the medium facing surface 80. The heat sink 54 is formed of one of Au, Cu, Ag, and Al, for example. The dielectric layer 24 is formed of the same material as the cladding, for example. The dielectric layers 25 and 26 are formed of silicon oxide, for example.

The main pole 27 is located on the heat sink 54 and the dielectric layers 25 and 26. The recording head unit may further include an unshown separating film interposed between the main pole 27 and the heat sink 54. The separating film has the function of preventing the material of the heat sink 54 from diffusing into the main pole 27. The separating film is formed of Ru, Cr, Zr, Ti or Ta, for example. The separating film is not an indispensable component of the thermally-assisted magnetic recording head 100, and may be omitted.

The recording head unit further includes a dielectric layer 28 located around the main pole 27. The third layers of the coupling sections 18A and 18B are embedded in the cladding layer 23 and the dielectric layers 24, 25 and 28. The top surfaces of the third layers of the main pole 27, the dielectric layer 28, and the third layers of the coupling sections 18A and 18B are even with each other. The dielectric layer 28 is formed of the same material as the cladding, for example.

The coil 29 is located on the dielectric layer 28. The recording head unit further includes an insulating layer 30 located to cover the coil 29. The yoke layer 31 is located on the main pole 27, the coupling sections 18A and 18B, the dielectric layer 28, and the insulating layer 30. The coil 29 is wound around portions of the yoke layer 31 that are located on the coupling sections 18A and 18B. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 27. The insulating layer 30 is formed of photoresist, for example.

As shown in FIG. 5 and FIG. 6, the thermally-assisted magnetic recording head 100 further includes a protective layer 32 disposed to cover the recording head unit. The protective layer 32 is formed of alumina, for example.

As has been described, the thermally-assisted magnetic recording head 100 according to the present embodiment includes the medium facing surface 80, the read head unit, and the recording head unit. The read head unit and the recording head unit are stacked on the substrate 1. The recording head unit is located on the front side (the trailing side) in the direction of travel of the recording medium 90 (the Z direction), relative to the read head unit.

The recording head unit includes the coils 15 and 29, the main pole 27, the waveguide, the plasmon generator 50, the heat sink 54, the shield 20, and the return path section R. The plasmon generator 50 and the main pole 27 are located on the front side in the direction of travel of the recording medium 90 relative to the core 22 of the waveguide.

The shield 20 and the return path section R have the function of allowing a magnetic flux that has been produced from the front end face 27a of the main pole 27 and has magnetized a portion of the recording medium 90 to flow back to the main pole 27.

Figure 1:
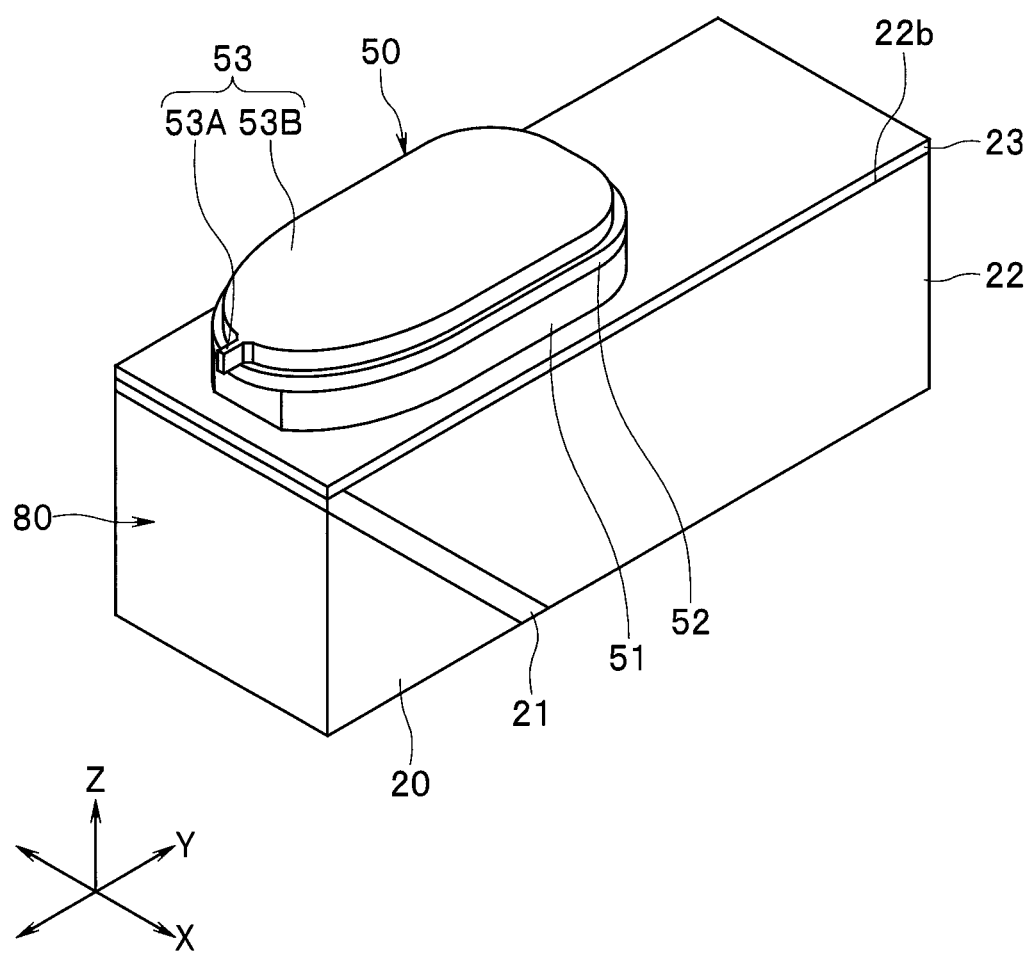
FIG. 1 is a perspective view showing essential parts of a thermally-assisted magnetic recording head according to a first embodiment of the invention.
Figure 2:
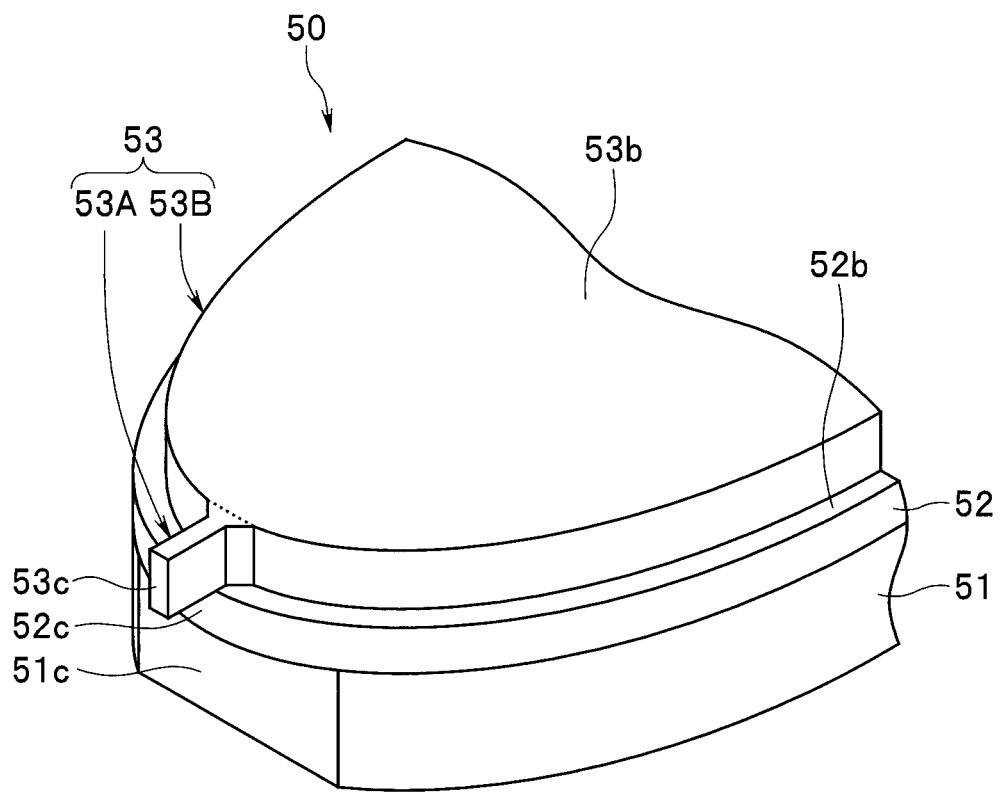
FIG. 2 is a perspective view showing a plasmon generator of the first embodiment of the invention.
Figure 2:
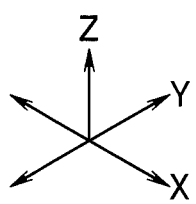
Figure 3:
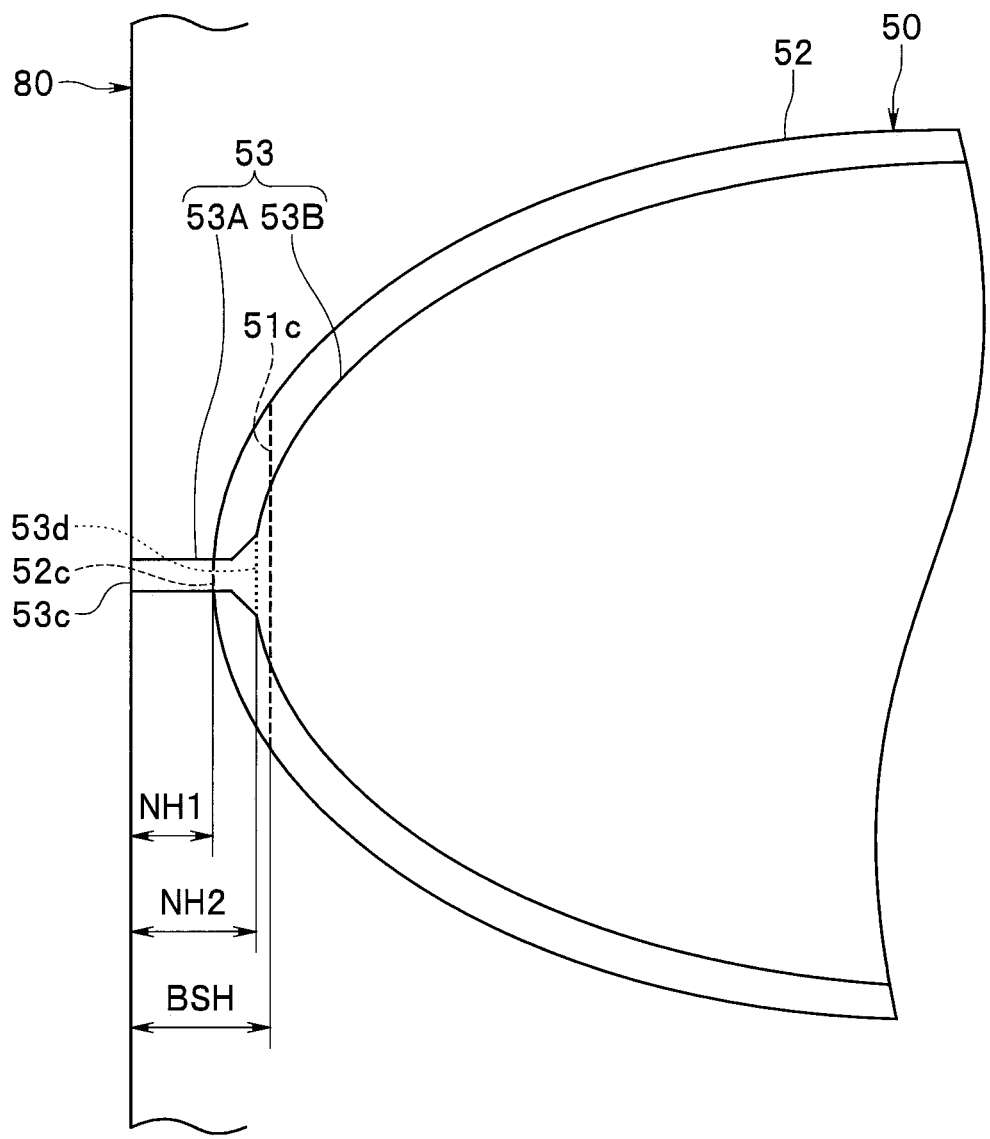
FIG. 3 is a plan view showing a plasmon generator of the first embodiment of the invention.
Figure 4:
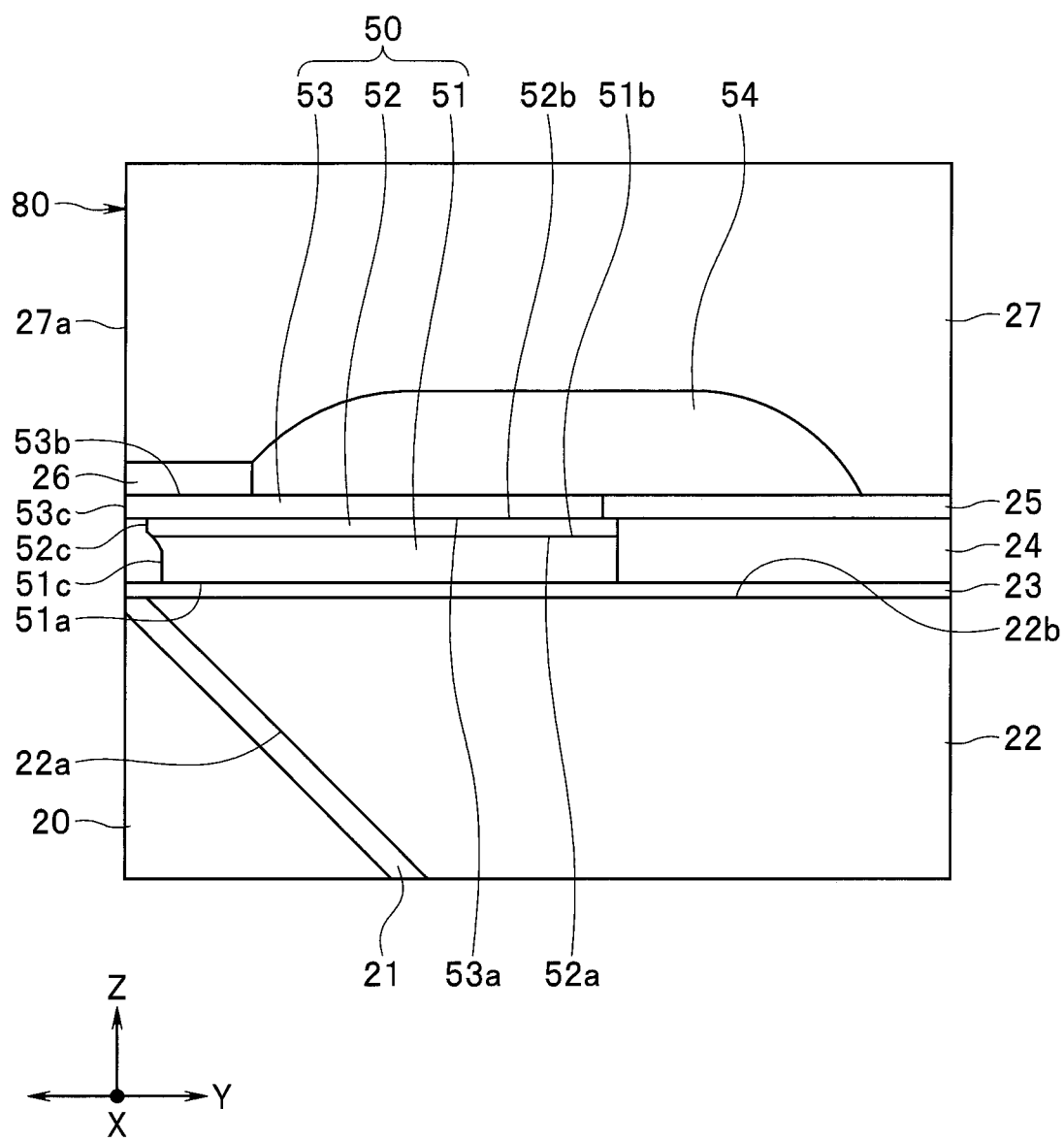
FIG. 4 is a cross-sectional view showing the essential parts of a thermally-assisted magnetic recording head according to the first embodiment of the invention.

The plasmon generator 50 will now be described in detail with reference to FIG. 1 to FIG. 4. FIG. 1 is a perspective view showing essential parts of the thermally-assisted magnetic recording head 100. FIG. 2 is a perspective view showing the plasmon generator 50. FIG. 3 is a plan view showing the plasmon generator 50. FIG. 4 is a cross-sectional view showing essential parts of the thermally-assisted magnetic recording head 100. FIGS. 1 to 4 also show the X, Y, and Z directions mentioned previously.

The plasmon generator 50 includes a first metal layer 51, a second metal layer 52, and a third metal layer 53. The first metal layer 51 is formed of a first metal material. The second metal layer 52 and the third metal layer 53 are each formed of a second metal material. The first metal material and the second metal material will be described in detail below.

The first metal layer 51 is a so-called planar plasmon generator (PPG). The first metal layer 51 decreases in width (dimension in the track width direction (X direction)) with decreasing distance to the medium facing surface 80. Part of the outer edge of the first metal layer 51 may be parabolic or substantially parabolic when seen in the Z direction. The first metal layer 51 has a thickness (dimension in the Z direction) in the range of 20 to 60 nm, for example.

The first metal layer 51 includes a plasmon exciting portion 51a configured to excite surface plasmons thereon. The plasmon exciting portion 51a is located at a predetermined distance from the evanescent light generating surface 22b of the core 22 and faces the evanescent light generating surface 22b. The cladding layer 23 is interposed between the evanescent light generating surface 22b and the plasmon exciting portion 51a.

The plasmon exciting portion 51a is the bottom surface of the first metal layer 51. The first metal layer 51 further includes a top surface 51b and a first front end 51c that faces the medium facing surface 80. The first front end 51c is located away from the medium facing surface 80. The distance between the medium facing surface 80 and the first front end 51c becomes maximum at or near the border between the first front end 51c and the evanescent light generating surface 22b, and becomes minimum at or near the border between the first front end 51c and the top surface 51b. In the present embodiment, the first front end 51c includes a bottom portion connected to the evanescent light generating surface 22b and a top portion connecting the bottom portion to the top surface 51b. The bottom portion may be a flat surface or a curved surface. The bottom portion may be inclined relative to the medium facing surface 80 or parallel or substantially parallel to the medium facing surface 80.

As shown in FIG. 3, the maximum distance between the medium facing surface 80 and the first front end 51c will be denoted by the symbol BSH. The distance BSH is in the range of 20 to 40 nm, for example.

The second metal layer 52 includes a bottom surface 52a and a top surface 52b located on a side opposite the bottom surface 52a. The bottom surface 52a of the second metal layer 52 is in contact with the top surface 51b of the first metal layer 51.

The third metal layer 53 includes a bottom surface 53a and a top surface 53b located on a side opposite the bottom surface 53a. The bottom surface 53a of the third metal layer 53 is in contact with the top surface 52b of the second metal layer 52. The top surface 53b of the third metal layer 53 is in contact with the heat sink 54.

The third metal layer 53 further includes a front end face 53c that generates near-field light from surface plasmons. The front end face 53c is located in the medium facing surface 80. The front end face 53c generates near-field light on the principle to be described later.

The third metal layer 53 includes a narrow portion 53A and a wide portion 53B which is located farther from the medium facing surface 80 than is the narrow portion 53A. The width of the narrow portion 53A in the track width direction (the X direction) may be constant regardless of the distance from the medium facing surface 80, or may decrease toward the medium facing surface 80. In particular, in the present embodiment, part of the narrow portion 53A other than near the wide portion 53B has a constant width in the track width direction regardless of the distance from the medium facing surface 80. Part of the narrow portion 53A near the wide portion 53B decreases in the width in the track width direction with decreasing distance to the medium facing surface 80.

The narrow portion 53A has a front end face located in the medium facing surface 80. The front end face of the narrow portion 53A is also the front end face 53c of the third metal layer 53. The narrow portion 53A can thus be said to have the front end face 53c. The narrow portion 53A further includes a rear end 53d opposite the front end face 53c, a bottom surface in contact with the second metal layer 52, and a top surface opposite the bottom surface.

The wide portion 53B is connected to the rear end 53d of the narrow portion 53A. In FIGS. 2 and 3, the border between the narrow portion 53A and the wide portion 53B is shown by a dotted line. The wide portion 53B has a maximum width greater than a maximum width of the narrow portion 53A in the track width direction (X direction). The wide portion 53B includes a bottom surface in contact with the second metal layer 52, and a top surface opposite the bottom surface. In particular, in the present embodiment, the wide portion 53B has a planar shape (shape seen in the Z direction) similar to that of the first metal layer 51. The outer edge of the planar shape of the wide portion 53B may be located along that of the planar shape of the first metal layer 51.

The second metal layer 52 has a planar shape similar to that of the first metal layer 51. The outer edge of the planar shape of the second metal layer 52 may be located along that of the planar shape of the first metal layer 51. In particular, in the present embodiment, the planar shape of the second metal layer 52 is also similar to that of the wide portion 53B of the third metal layer 53. The outer edge of the planar shape of the wide portion 53B of the third metal layer 53 may be located along that of the planar shape of the second metal layer 52.

The narrow portion 53A and the wide portion 53B of the third metal layer 53 are located on the second metal layer 52. The second metal layer 52 has a maximum width greater than that of the narrow portion 53A of the third metal layer 53 in the track width direction (X direction).

The second metal layer 52 includes a second front end 52c facing the medium facing surface 80. The second front end 52c is located away from the medium facing surface 80. The rear end 53d of the narrow portion 53A of the third metal layer 53 is located farther from the medium facing surface 80 than is the second front end 52c of the second metal layer 52.

As shown in FIG. 3, the distance between the medium facing surface 80 and the second front end 52c will be denoted by the symbol NH1. The distance NH1 is in the range of 5 to 20 nm, for example. The distance BSH may be greater than the distance NH1. As shown in FIG. 3, the distance between the medium facing surface 80 and the rear end 53d will be denoted by the symbol NH2. The distance NH2 is the same as the length of the narrow portion 53A in the direction perpendicular to the medium facing surface 80 (Y direction). The distance NH2 is in the range of 20 to 30 nm, for example.

The width (the dimension in the track width direction (the X direction) of the front end face 53c of the third metal layer 53 is defined by the width of the narrow portion 53A of the third metal layer 53 in the medium facing surface 80. The width of the front end face 53c falls within the range of 5 to 40 nm, for example. The height (the dimension in the Z direction) of the front end face 53c is defined by the thickness (the dimension in the Z direction) of the narrow portion 53A in the medium facing surface 80. The height of the front end face 53c is preferably in the range of 5 to 40 nm, and more preferably in the range of 14 to 22 nm, for example.

The wide portion 53B of the third metal layer 53 may have the same thickness as that of the narrow portion 53A. The second metal layer 52 has a thickness in the range of 10 to 30 nm, for example. The first metal layer 51 has a thickness in the range of 10 to 60 nm, for example.

A metal material suitable for excitation and propagation of surface plasmons is selected as the first metal material for forming the first metal layer 51.

The third metal layer 53 includes the front end face 53c that generates near-field light. Part of the energy of the near-field light is converted into heat in the third metal layer 53. To prevent deformation or breakage due to heat generation, a metal material having high hardness is thus selected as the second metal material for forming the third metal layer 53. To prevent the first metal layer 51 from being deformed by the heat generation of the third metal layer 53, the second metal layer 52 interposed between the first metal layer 51 and the third metal layer 53 is also formed of the second metal material.

The second metal material may have Vickers hardness higher than that of the first metal material. The second metal material may contain any one of Pt, Rh, and Ir. The second and third metal layers 52 and 53 may each be formed of one of Pt, Rh, and Ir, or may be made of an alloy such as a PtAu alloy, a PtRh alloy, an RhAu alloy, a PtIr alloy, and IrAu alloy.

The first metal material may have electrical conductivity higher than that of the second metal material. The first metal material may include any one of Au, Cu, Ag, and Al. Au is particularly preferable.

Now, the principle of generation of near-field light in the present embodiment and the principle of thermally-assisted magnetic recording using near-field light will be described in detail. Laser light emitted from a laser diode (not shown) enters the core 22. As shown in FIG. 5, the laser light 70 propagates through the core 22 toward the medium facing surface 80 and reaches the vicinity of the first metal layer 51 of the plasmon generator 50. The evanescent light generating surface 22b of the core 22 generates evanescent light from the laser light 70 propagating through the core 22. More specifically, the laser light 70 is totally reflected at the evanescent light generating surface 22b, and this causes the evanescent light generating surface 22b to generate evanescent light permeating into the cladding layer 23. In the first metal layer 51, surface plasmons are excited on the plasmon exciting portion 51a through coupling with the aforementioned evanescent light. The excited surface plasmons propagate to the front end face 53c through the first metal layer 51, the second metal layer 52 and the third metal layer 53. The third metal layer 53 generates near-field light from those surface plasmons at the front end face 53c.

The near-field light generated at the front end face 53c is projected toward the recording medium 90, reaches the surface of the recording medium 90, and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 27 for data writing.

Now, functions and effects specific to the thermally-assisted magnetic recording head 100 according to the present embodiment will be described. In the present embodiment, the plasmon generator 50 includes the first metal layer 51, the second metal layer 52, and the third metal layer 53. Consider now a plasmon generator of a comparative example where the second metal layer 52 is not included. The plasmon generator of the comparative example has a problem that the generation of near-field light at the front end face 53c of the third metal layer 53 generates heat, and this heat is transferred to the first metal layer 51 to cause the first metal layer 51 to get hot and can deform the first front end 51c of the first metal layer 51 so that the first metal layer 51 gets farther from the medium facing surface 80.

By contrast, according to the present embodiment, the second metal layer 52 is interposed between the first metal layer 51 and the third metal layer 53. In the present embodiment, the heat generated in the third metal layer 53 is transferred via the second metal layer 52 and thus not directly transferred to the first metal layer 51, and is also diffused in the second metal layer 52. According to the present embodiment, the deformation of the first metal layer 51 can thus be avoided.

In the plasmon generator of the comparative example, the length (dimension in the Y direction) of the narrow portion 53A of the third metal layer 53 can be reduced to improve the life of the plasmon generator of the comparative example. However, as shown in FIG. 3, the width (dimension in the X direction) of the narrow portion 53A increases near the wide portion 53B. Reducing the length of the narrow portion 53A therefore has a problem of substantially increasing the width of the narrow portion 53A, thereby spreading the near-field light.

By contrast, according to the present embodiment, the second metal layer 52 and the third metal layer 53 constitute a layered film of the second metal material. This layered film includes a narrow portion constituted by part of the narrow portion 53A and a wide portion constituted by the wide portion 53B and the second metal layer 52. The life of the plasmon generator 50 can be improved by reducing the length of the narrow portion of the foregoing layered film of the plasmon generator 50. The length of the narrow portion of the foregoing layered film is equivalent to the distance from the medium facing surface 80 to the position where the second front end 52c of the second metal layer 52 intersects the narrow portion 53A of the third metal layer 53. In other words, according to the present embodiment, the length of the narrow portion of the foregoing layered film can be controlled by the position of the second front end 52c. In addition, the rear end 53d of the narrow portion 53A can be located farther from the medium facing surface 80 than is the second front end 52c. According to the present embodiment, the part where the narrow portion 53A increases in width can thus be located farther from the medium facing surface 80 than is the second front end 52c. As a result, according to the present embodiment, the spreading of the near-field light can be suppressed.

Typically, the third metal layer 53 is formed by patterning a metal film using a photoresist mask having a shape corresponding to the narrow portion 53A and the wide portion 53B. However, there is a limit to the reduction of the length of the narrow portion 53A because of the precision of the process for forming the photoresist mask.

By contrast, in the present embodiment, the length of the narrow portion of the foregoing layered film can be controlled by the position of the second front end 52c as described above. The position of the second front end 52c can be controlled by the photoresist mask used in forming the second metal layer 52. In the present embodiment, the second metal layer 52 does not include a narrow portion like the narrow portion 53A of the third metal layer 53. According to the present embodiment, the photoresist mask used in forming the second metal layer 52 can thus be formed more accurately than the one used in forming the third metal layer 53. According to the present embodiment, the second front end 52c can therefore be brought close to the medium facing surface 80, and as a result, the length of the narrow portion of the foregoing layered film can be reduced.

Consequently, according to the present embodiment, a plasmon generator 50 that has high reliability and can increase recording density can be implemented.

In the plasmon generator of the comparative example, the third metal layer 53 needs to be reduced to some extent in thickness to make the height (dimension in the Z direction) of the front end face 53c small to some extent. Reducing the thickness of the third metal layer 53 is likely to shorten the life of the third metal layer 53. By contrast, in the present embodiment, the thickness of the third metal layer 53 can be reduced to make the height (dimension in the Z direction) of the front end face 53c small to some extent while the second metal layer 52 increases the thickness of the layered film constituted by the second metal layer 52 and the third metal layer 53 without changing the height of the front end face 53c. Therefore, according to the present embodiment, the life of the layered film can thus be improved.

A method of manufacturing the thermally-assisted magnetic recording head 100 according to the present embodiment will now be described. The method of manufacturing the thermally-assisted magnetic recording head 100 includes the steps of: forming components of a plurality of thermally-assisted magnetic recording heads 100, except the substrates 1, on a wafer that includes portions to become the substrates 1 of the plurality of thermally-assisted magnetic recording heads 100, thereby fabricating a substructure including a plurality of pre-head portions arranged in rows, the plurality of pre-head portions becoming individual thermally-assisted magnetic recording heads 100 later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads 100 are produced in this manner.

The method of manufacturing the thermally-assisted magnetic recording head 100 according to the present embodiment will be described in more detail below with attention focused on a single thermally-assisted magnetic recording head 100. The method of manufacturing the thermally-assisted magnetic recording head 100 starts with forming the insulating layer 2, the bottom shield layer 3, and the bottom shield gap film 4 in this order on the substrate 1. Then, the MR element 5 and two leads (not shown) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, an unshown insulating layer is formed to cover the return pole layer 11. The unshown insulating layer is then polished by, for example, chemical mechanical polishing (hereinafter referred to as CMP), until the return pole layer 11 is exposed. Next, the insulating layer 14 is formed on the return pole layer 11. Next, the insulating layer 14 is selectively etched to form two openings in the insulating layer 14. Next, the coupling layers 12 and 13 are formed on the return pole layer 11 at the positions of the two openings. Next, the coil 15 is formed on the insulating layer 14. Next, the insulating layer 16 is formed between the windings of the coil 15 and between the coupling layer 12 and the coil 15. Next, an unshown insulating layer is formed over the entire top surface of the stack. Next, the unshown insulating layer is polished by, for example, CMP until the coupling layers 12 and 13 and the coil 15 are exposed.

Next, the coupling layer 17 is formed on the coupling layer 12, and the first layers of the respective coupling sections 18A and 18B are formed on the coupling layer 13. Next, the cladding layer 19 is formed over the entire top surface of the stack. Next, the cladding layer 19 is polished by, for example, CMP until the coupling layer 17 and the first layers of the respective coupling sections 18A and 18B are exposed.

The shield 20 is then formed on the coupling layer 17. Next, the cladding layer 21 is formed on the shield 20. Next, the second layers of the respective coupling sections 18A and 18B are formed on the first layers of the respective coupling sections 18A and 18B. Next, the core 22 is then formed on the cladding layer 19. Next, the surrounding cladding layer is formed over the entire top surface of the stack. The surrounding cladding layer and the cladding layer 21 are then polished by, for example, CMP until the core 22 and the second layers of the coupling sections 18A and 18B are exposed.

Figure 7:
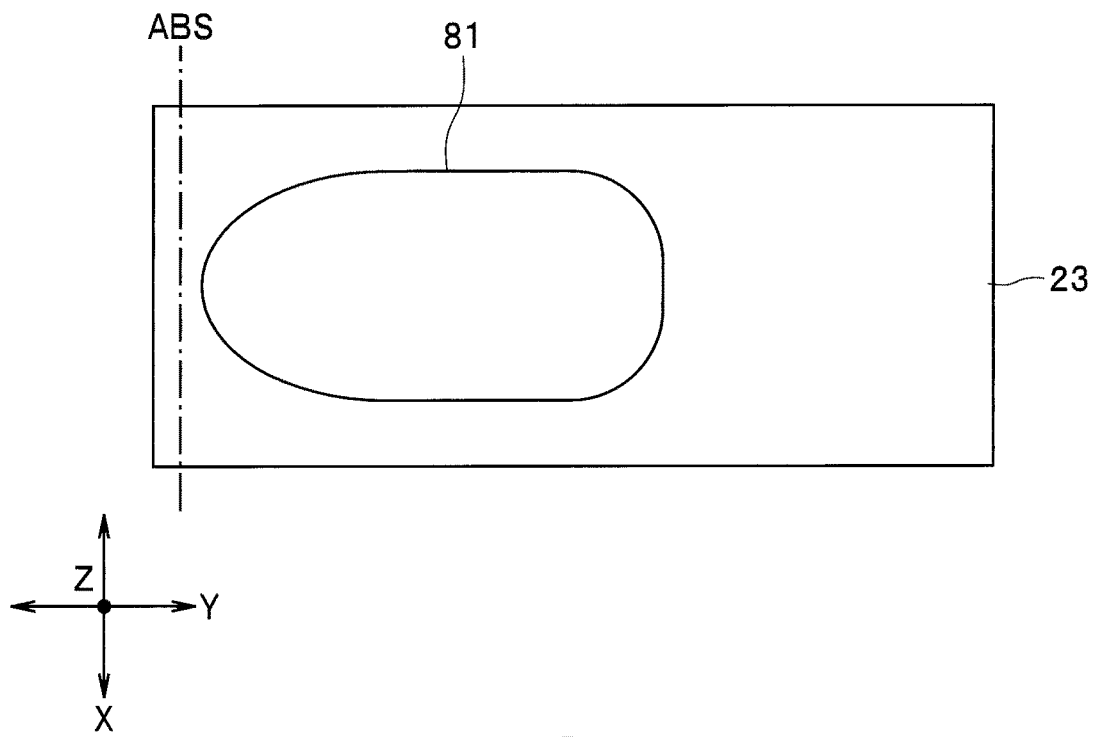
FIG. 7 is a plan view showing a step of a manufacturing method for the thermally-assisted magnetic recording head according to the first embodiment of the invention.
Figure 9:
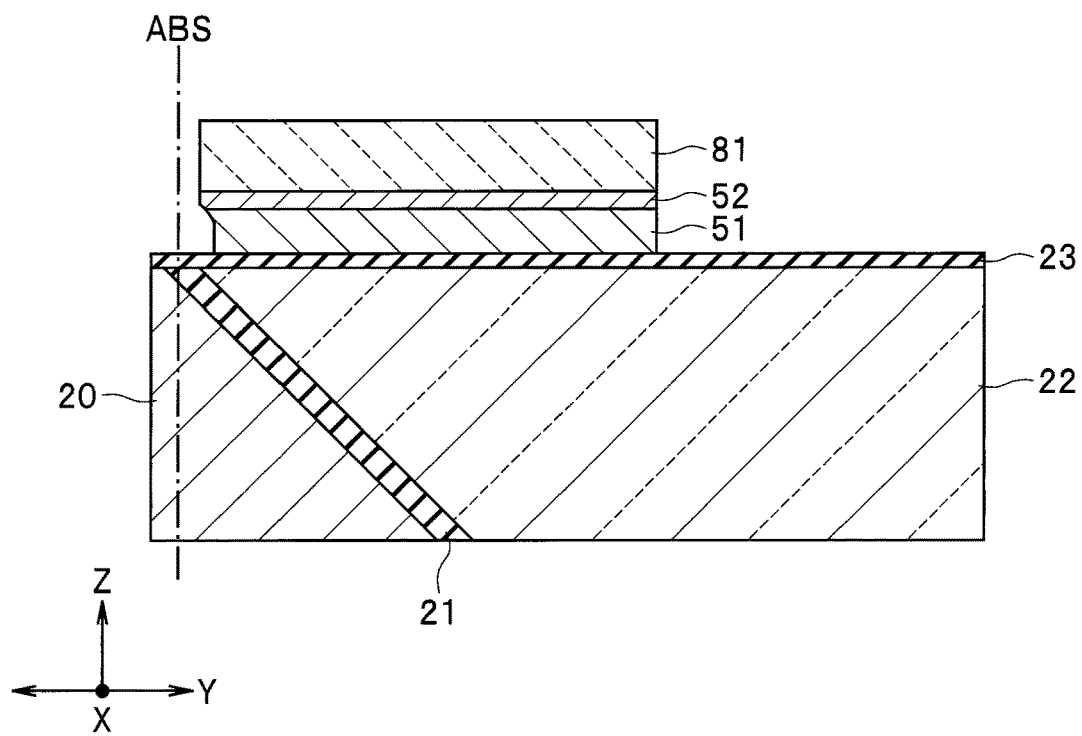
FIG. 9 is a cross-sectional view showing a step that follows the step shown in FIGS. 7 and 8.
Figure 10:
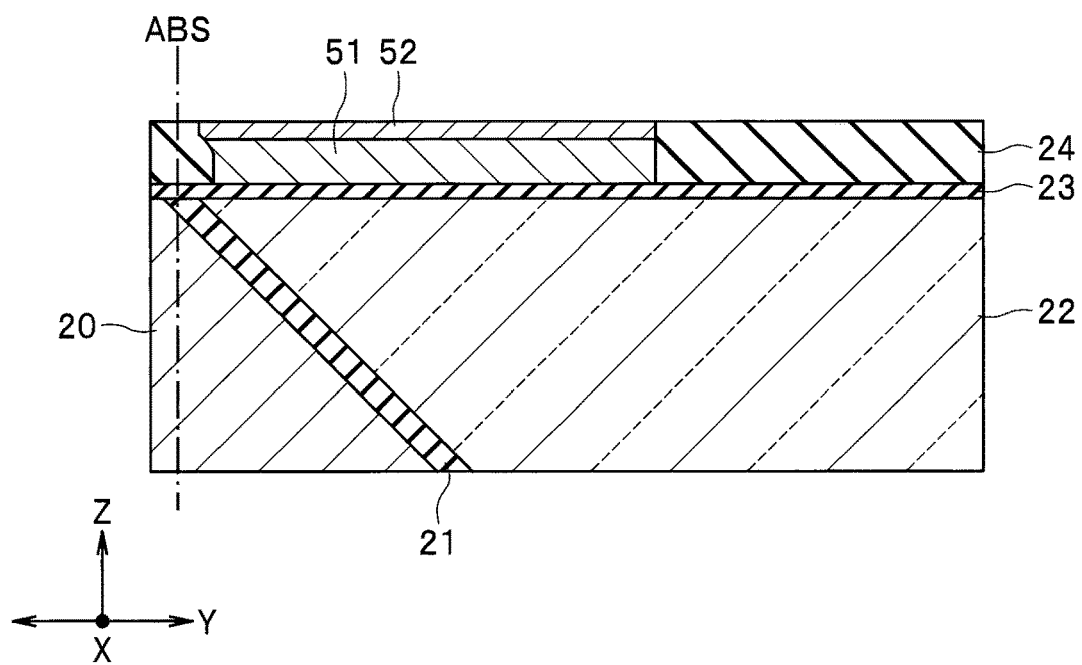
FIG. 10 is a cross-sectional view showing a step that follows the step shown in FIG. 9.
Figure 11:
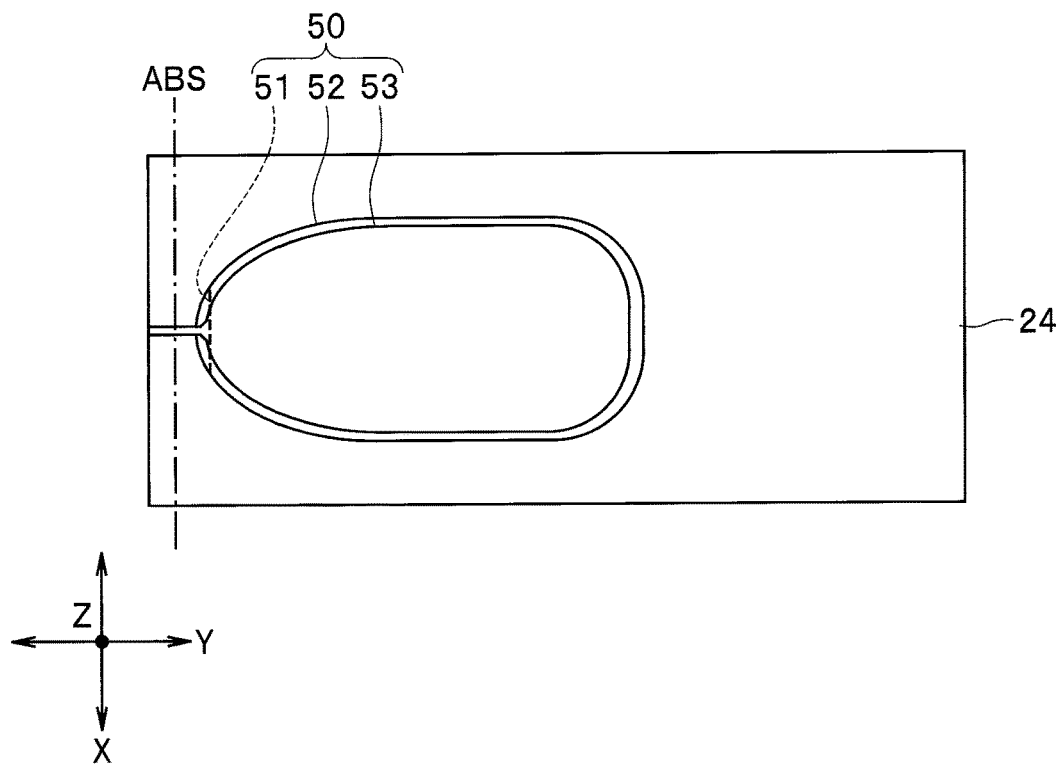
FIG. 11 is a plan view showing a step that follows the step shown in FIG. 10.
Figure 12:
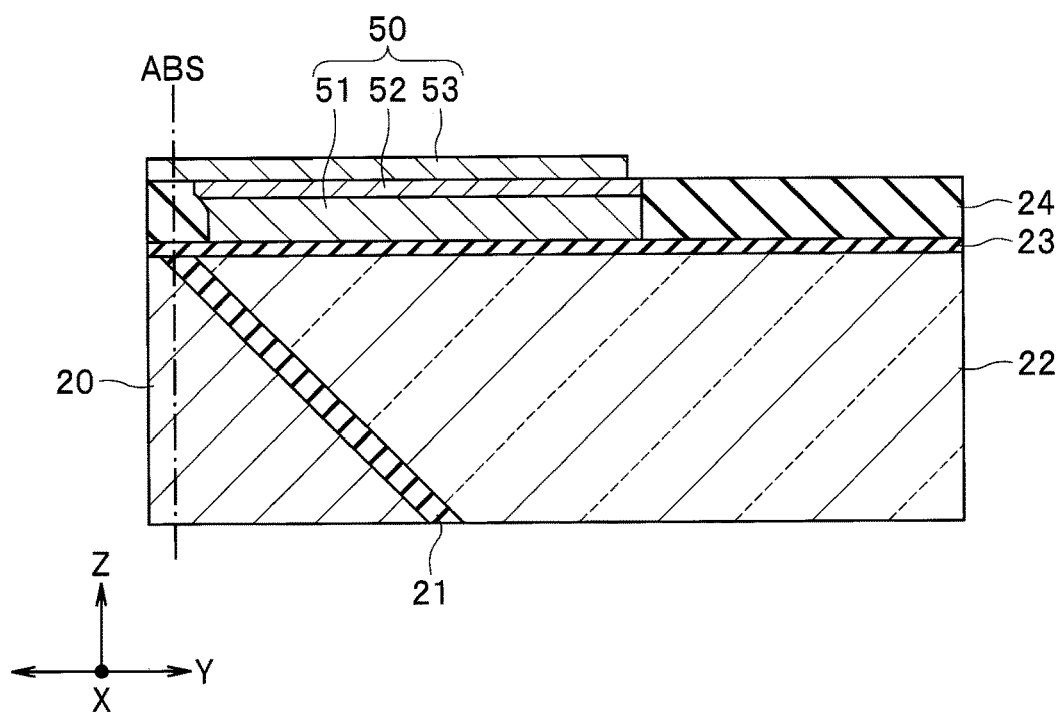
FIG. 12 is a cross-sectional view showing the step shown in FIG. 11.
Figure 13:
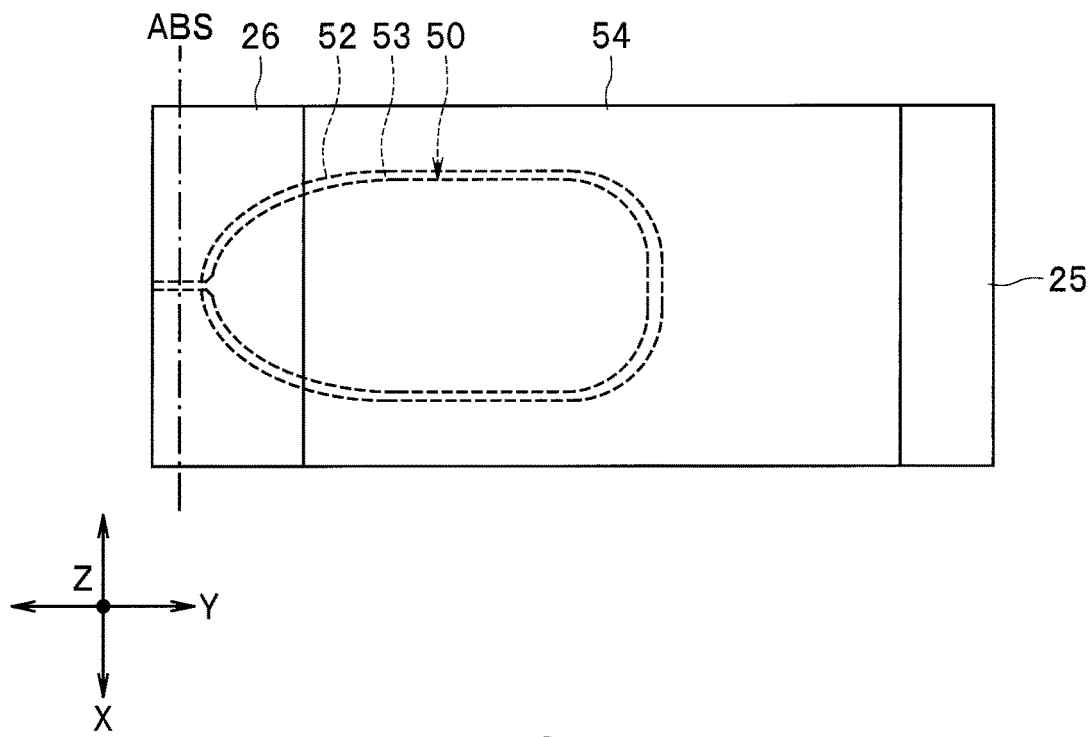
FIG. 13 is a plan view showing a step that follows the step shown in FIGS. 11 and 12.

Reference is now made to FIG. 7 to FIG. 15 to describe steps to be performed after the polishing of the surrounding cladding layer and the cladding layer 21 up to the formation of the main pole 27. FIG. 7 to FIG. 15 each show a stack of layers formed in the process of manufacturing the thermally-assisted magnetic recording head 100. FIG. 7, FIG. 11 and FIG. 13 each show the top surface of part of the stack. FIG. 8 to FIG. 10, FIG. 12, FIG. 14 and FIG. 15 each show a cross section that intersects the front end face 27a of the main pole 27 and that is perpendicular to the medium facing surface 80 and to the top surface 1a of the substrate 1. In FIG. 7 to FIG. 15, the symbol ABS indicates the location at which the medium facing surface 80 is to be formed. FIG. 8 to FIG. 10, FIG. 12, FIG. 14 and FIG. 15 omit the illustration of portions located below the shield 20 and the core 22.

Figure 8:
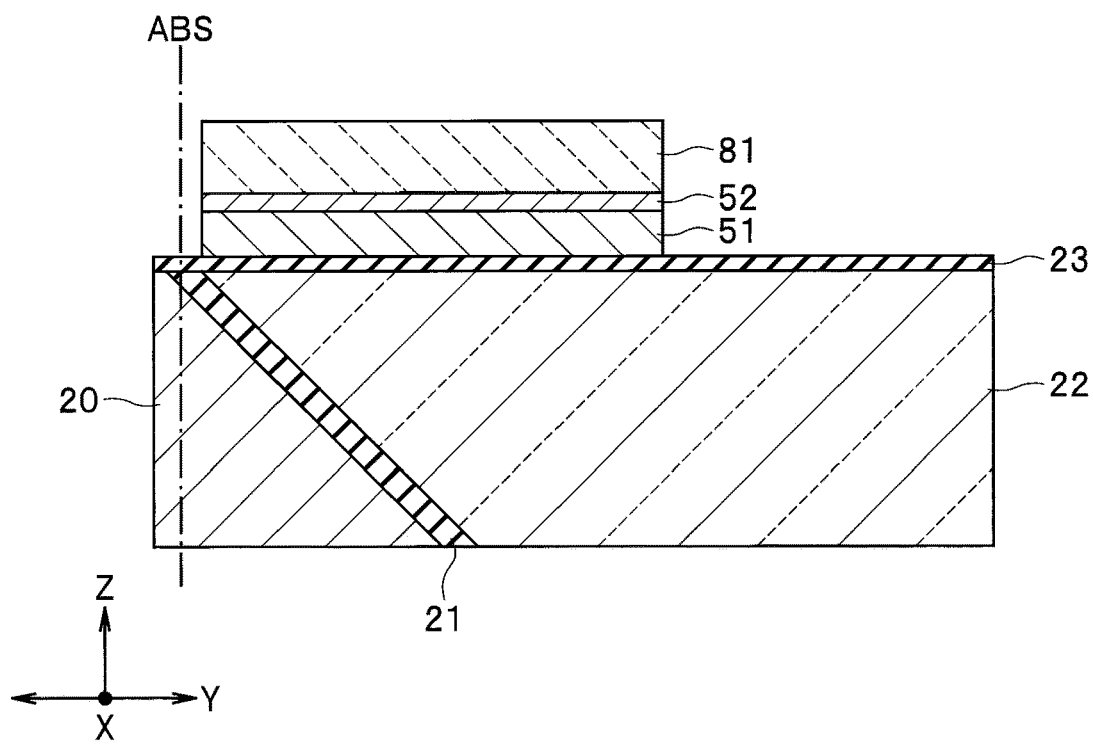
FIG. 8 is a cross-sectional view showing the step shown in FIG. 7.

FIG. 7 and FIG. 8 show a step that follows the polishing of the surrounding cladding layer and the cladding layer 21. In this step, the cladding layer 23 is initially formed on the entire top surface of the stack. Next, a first metal film made of the first metal material is formed on the cladding layer 23 by sputtering, for example. Next, a second metal film made of the second metal material is formed on the first metal film by sputtering, for example. Next, a mask 81 for patterning the first and second metal films is formed on the second metal film. The mask 81 is formed of carbon, for example. The mask 81 has a planar shape corresponding to that of the second metal layer 52 to be eventually formed. Next, using the mask 81, the first and second metal films are etched by IBE, for example. This etching makes the first metal film into the first metal layer 51, and the second metal film into the second metal layer 52.

FIG. 9 shows the next step. In this step, part of the first metal layer 51 near the location where the medium facing surface 80 is to be formed is etched so that the maximum distance BSH between the medium facing surface 80 and the first front end 51c becomes greater than the distance NH1 between the medium facing surface 80 and the second front end 52c, as shown in FIG. 3. This etching is performed by IBE, for example. In the case of using IBE, the traveling direction of the ion beam is tilted relative to the top surface 1a of the substrate 1 (see FIGS. 5 and 6). Next, the mask 81 is removed.

FIG. 10 shows the next step. In this step, the dielectric layer 24 is initially formed on the entire top surface of the stack. Next, the dielectric layer 24 is polished by CMP, for example, until the second metal layer 52 is exposed.

FIG. 11 and FIG. 12 show the next step. In this step, a metal film made of the second metal material is initially formed on the second metal layer 52 and the dielectric layer 24 by sputtering, for example. Next, a mask for patterning the metal film is formed on the metal film. The mask includes a first portion and a second portion. The first portion has a planar shape corresponding to that of the narrow portion 53A of the third metal layer 53 to be eventually formed. The second portion has a planar shape corresponding to that of the wide portion 53B of the third metal layer 53 to be eventually formed. Next, using the mask, the metal film is etched by IBE, for example. This etching makes the metal film into the third metal layer 53. Next, the mask is removed.

Figure 14:
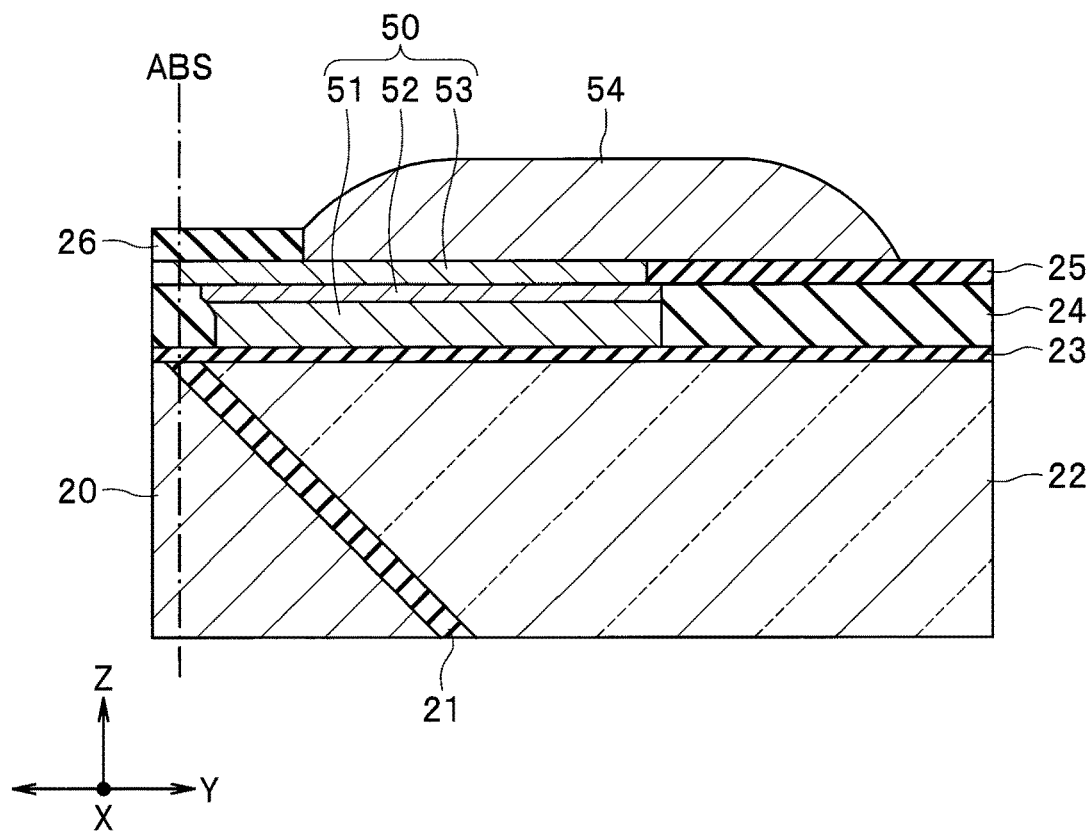
FIG. 14 is a cross-sectional view showing the step shown in FIG. 13.

FIG. 13 and FIG. 14 show the next step. In this step, the dielectric layer 25 is initially formed on the entire top surface of the stack. Next, the dielectric layer 25 is polished by CMP, for example, until the third metal layer 53 is exposed. Next, the dielectric layer 26 is formed on the third metal layer 53 and the dielectric layer 25. Next, the heat sink 54 is formed on the third metal layer 53 and the dielectric layer 25 by a lift-off method, for example.

Figure 15:
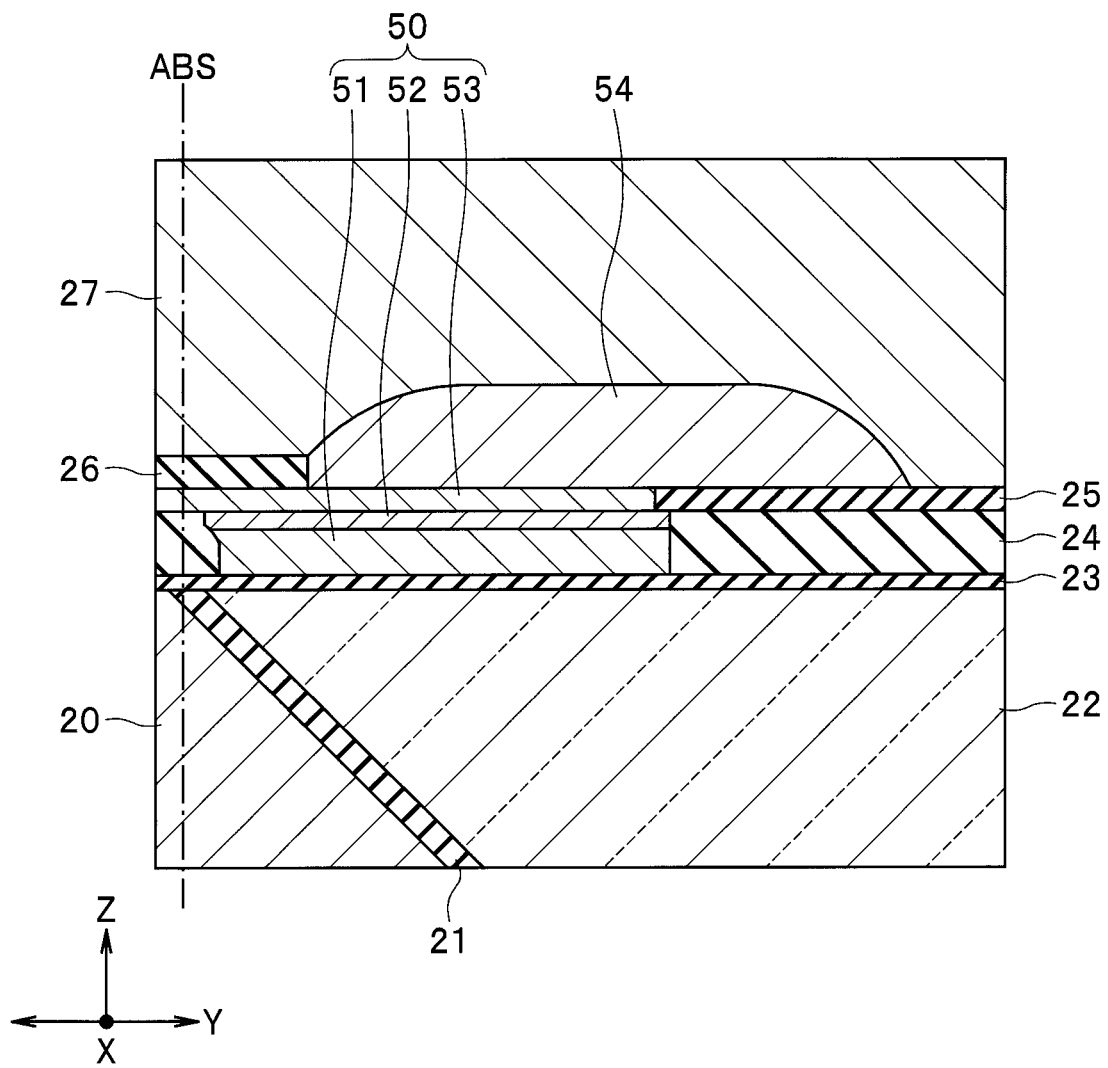
FIG. 15 is a cross-sectional view showing a step that follows the step shown in FIGS. 13 and 14.

FIG. 15 shows the next step. In this step, the cladding layer 23 and the dielectric layers 24 and 25 are initially selectively etched so that two openings for exposing the top surfaces of the second layers of the respective coupling sections 18A and 18B are formed in each of the cladding layer 23 and the dielectric layers 24 and 25. Next, a photoresist layer is formed. The photoresist layer has a first opening having a shape corresponding to that of the main pole 27, a second opening having a shape corresponding to that of the third layer of the coupling section 18A, and a third opening having a shape corresponding to that of the third layer of the coupling section 18B. Next, the main pole 27 is formed in the first opening, the third layer of the coupling section 18A in the second opening, and the third layer of the coupling section 18B in the second opening by plating, for example. Next, the photoresist layer is removed.

Steps to follow the step shown in FIG. 15 will now be described with reference to FIG. 5. The dielectric layer 28 is initially formed on the entire top surface of the stack. Next, the dielectric layer 28 is polished by, for example, CMP until the main pole 27 and the third layers of the respective coupling sections 18A and 18B are exposed. Next, the coil 29 is formed on the dielectric layer 28. Next, the insulating layer 30 is formed to cover the coil 29. Next, the yoke layer 31 is formed on the main pole 27, the third layers of the respective coupling sections 18A and 18B, and the insulating layer 30. Then, the protective layer 32 is formed to cover the yoke layer 31. Wiring, terminals, and other components are then formed on the top surface of the protective layer 32. When the substructure is thus completed, the step of forming the medium facing surface 80 is performed. A protective film for covering the medium facing surface 80 may be formed thereafter. Being provided with the medium facing surface 80, each pre-head portion becomes a thermally-assisted magnetic recording head 100.

The step of forming the medium facing surface 80 includes the step of polishing the surface of each pre-head portion that has resulted from cutting the substructure, and the step of forming a rail on the polished surface for allowing the slider to fly.

As described above, the manufacturing method for the thermally-assisted magnetic recording head 100 according to the present embodiment includes the steps of forming the main pole 27, forming the waveguide, and forming the plasmon generator 50. The step of forming the plasmon generator 50 includes the steps of forming the first metal layer 51 and the second metal layer 52, and forming the third metal layer 53. The step of forming the first metal layer 51 and the second metal layer 52 includes the steps of forming the first metal film of the first metal material, forming the second metal film of the second metal material on the first metal film, etching the first metal film and the second metal film so that the first metal film and the second metal film make the first metal layer 51 and the second metal layer 52, respectively, and etching part of the first metal layer 51 near the location where the medium facing surface 80 is to be formed (the step shown in FIG. 9).

The maximum distance BSH between the medium facing surface 80 and the first front end 51c of the first metal layer 51 and the distance NH1 between the medium facing surface 80 and the second front end 52c of the second metal layer 52 shown in FIG. 3 characteristically have respective optimum values. According to the present embodiment, the distance BSH can be made greater than the distance NH1 in the step shown in FIG. 9. The step shown in FIG. 9 may be omitted if the distance BSH and the distance NH1 are intended to be the same.

Modification Examples

Figure 16:
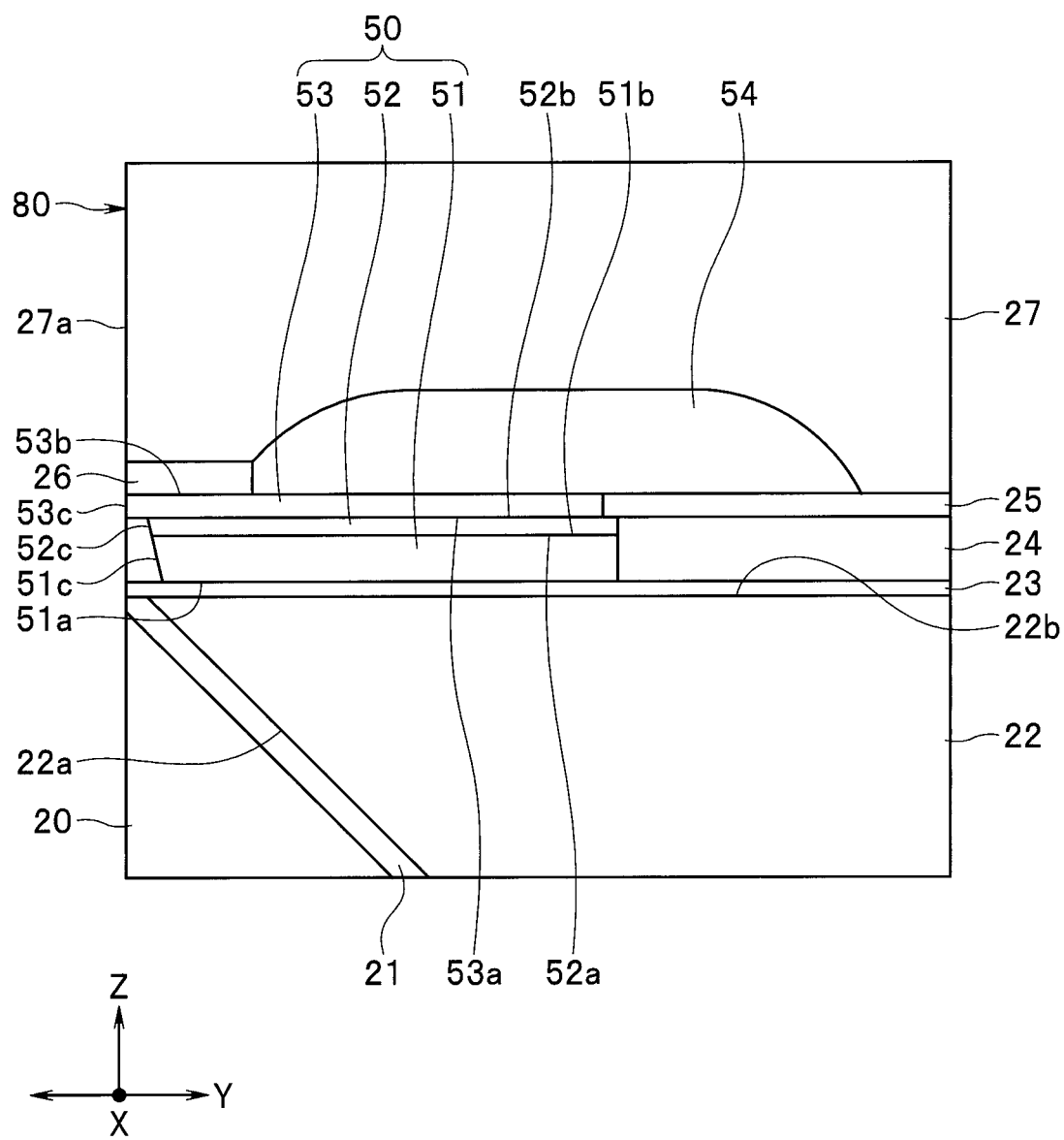
FIG. 16 is a cross-sectional view showing essential parts in a first modification example of the thermally-assisted magnetic recording head according to the first embodiment of the invention.

Modification examples of the thermally-assisted magnetic recording head 100 according to the present embodiment will now be described. FIG. 16 is a cross-sectional view showing essential parts of the thermally-assisted magnetic recording head 100 in a first modification example. In the first modification example, the first front end 51c of the first metal layer 51 and the second front end 52c of the second metal layer 52 form a single continuous tapered surface. This tapered surface can be formed, for example, in the step shown in FIG. 9 by taper-etching part of each of the first metal layer 51 and the second metal layer 52 near the location where the medium facing surface 80 to be formed.

Figure 17:
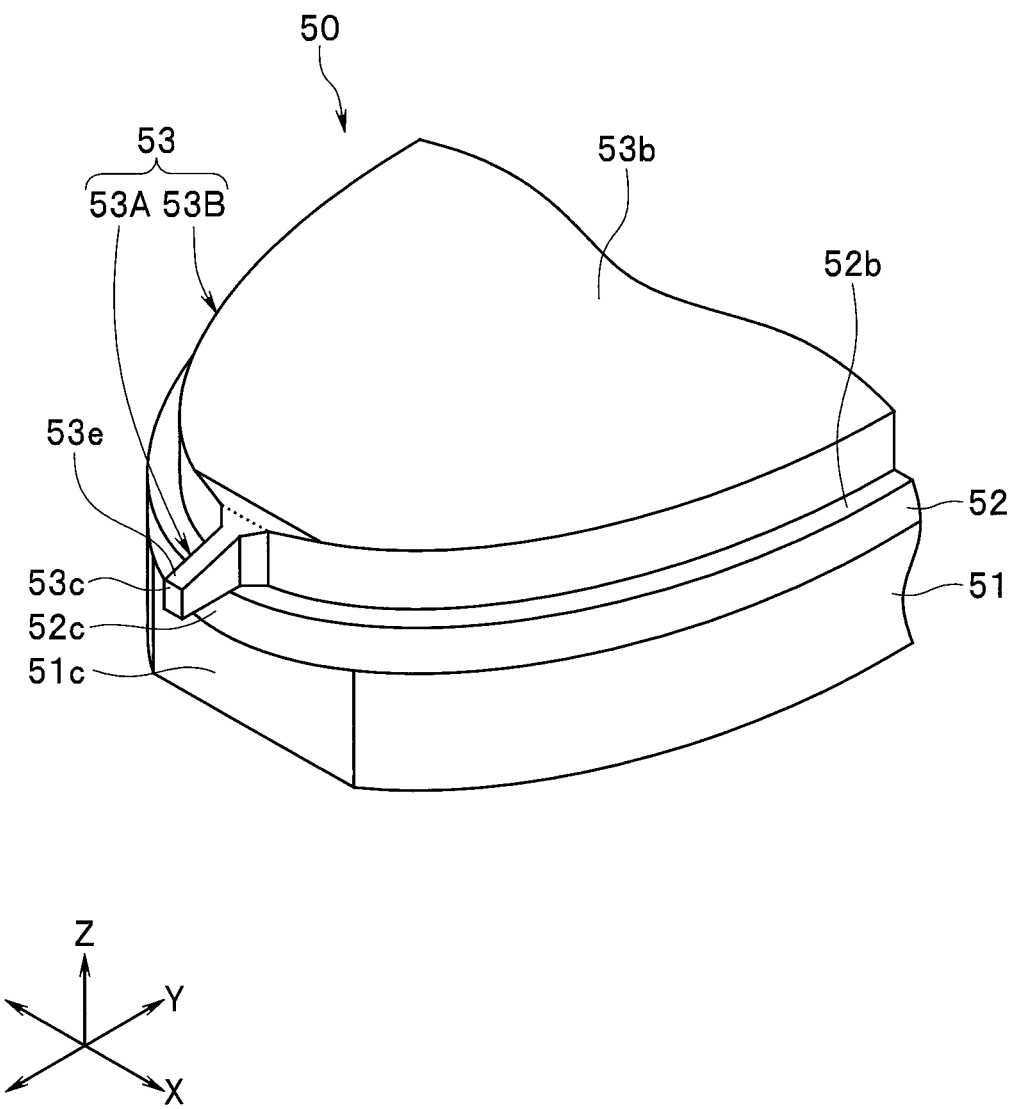
FIG. 17 is a perspective view showing a plasmon generator included in a second modification example of the thermally-assisted magnetic recording head according to the first embodiment of the invention.

FIG. 17 is a perspective view showing the plasmon generator 50 included in a second modification example of the thermally-assisted magnetic recording head 100. In the second modification, the third metal layer 53 includes an inclined surface 53e inclined relative to the direction perpendicular to the medium facing surface 80 (Y direction), aside from the bottom surface 53a, the top surface 53b, and the front end face 53c. The inclined surface 53e connects the top surface 53b and the front end face 53c.

The top surface of the narrow portion 53A of the third metal layer 53 includes an inclined portion constituting part of the inclined surface 53e. In the second modification example, the entire top surface of the narrow portion 53A is the inclined portion. The top surface of the wide portion 53B of the third metal layer 53 includes an inclined portion continuous with the inclined portion of the narrow portion 53A.

In the second modification example, the inclined portion of the narrow portion 53A and the inclined portion of the wide portion 53B can reduce the thickness of the third metal layer 53 in the medium facing surface 80 while increasing the thickness of the third metal layer 53 at a position away from the medium facing surface 80 to increase the volume and heat capacity of the third metal layer 53.

Second Embodiment

Figure 18:
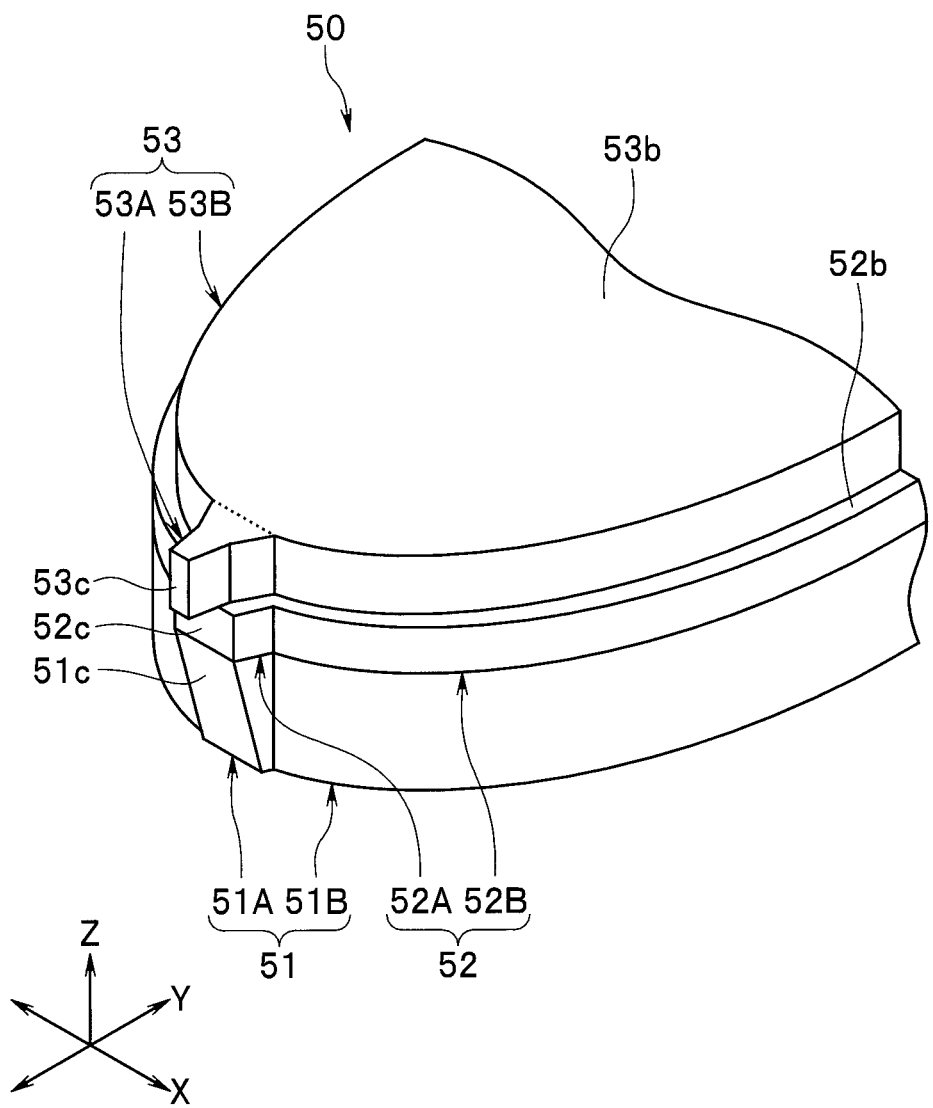
FIG. 18 is a perspective view showing a plasmon generator of a second embodiment of the invention.
Figure 19:
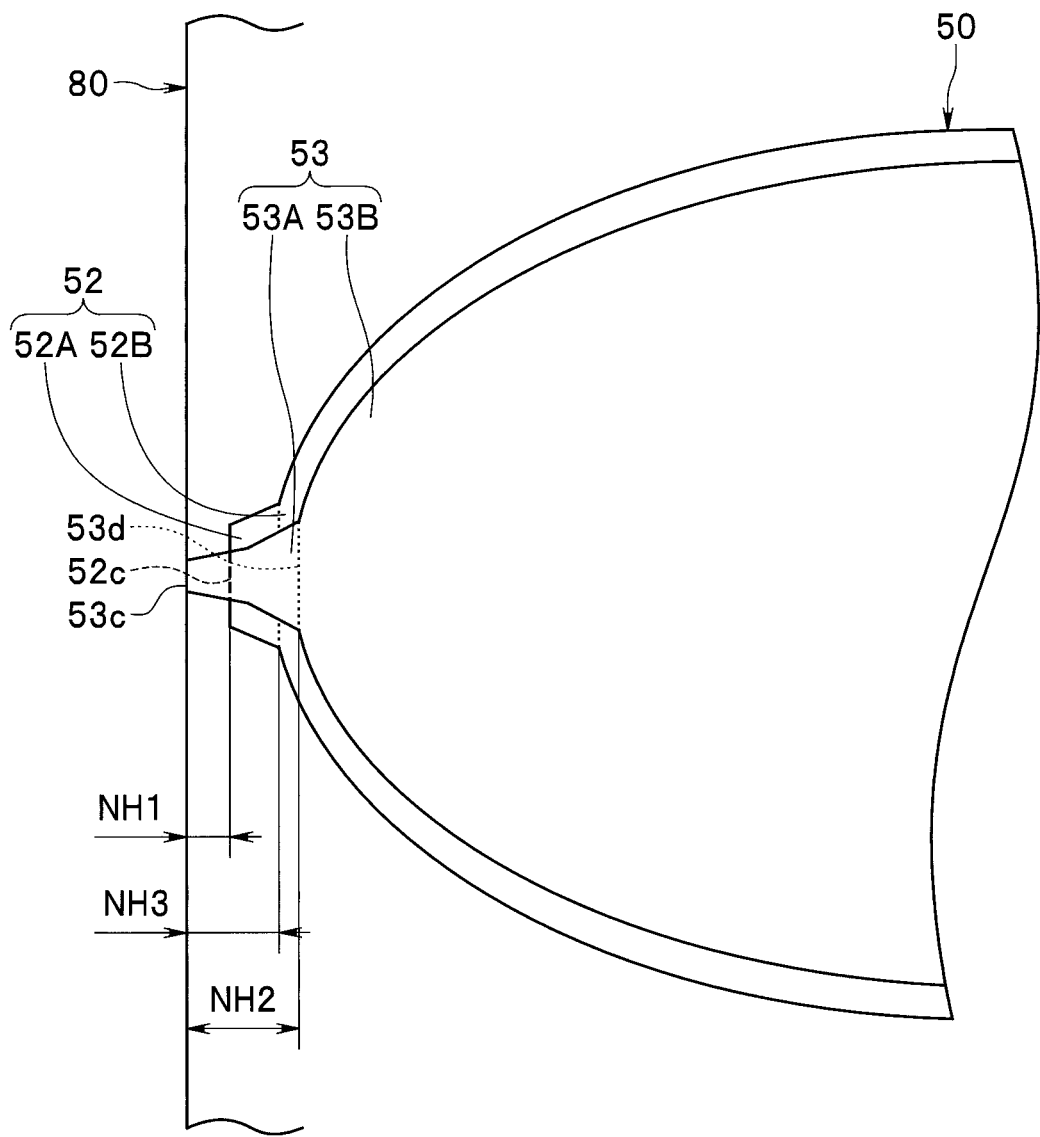
FIG. 19 is a plan view showing the plasmon generator of the second embodiment of the invention.
Figure 20:
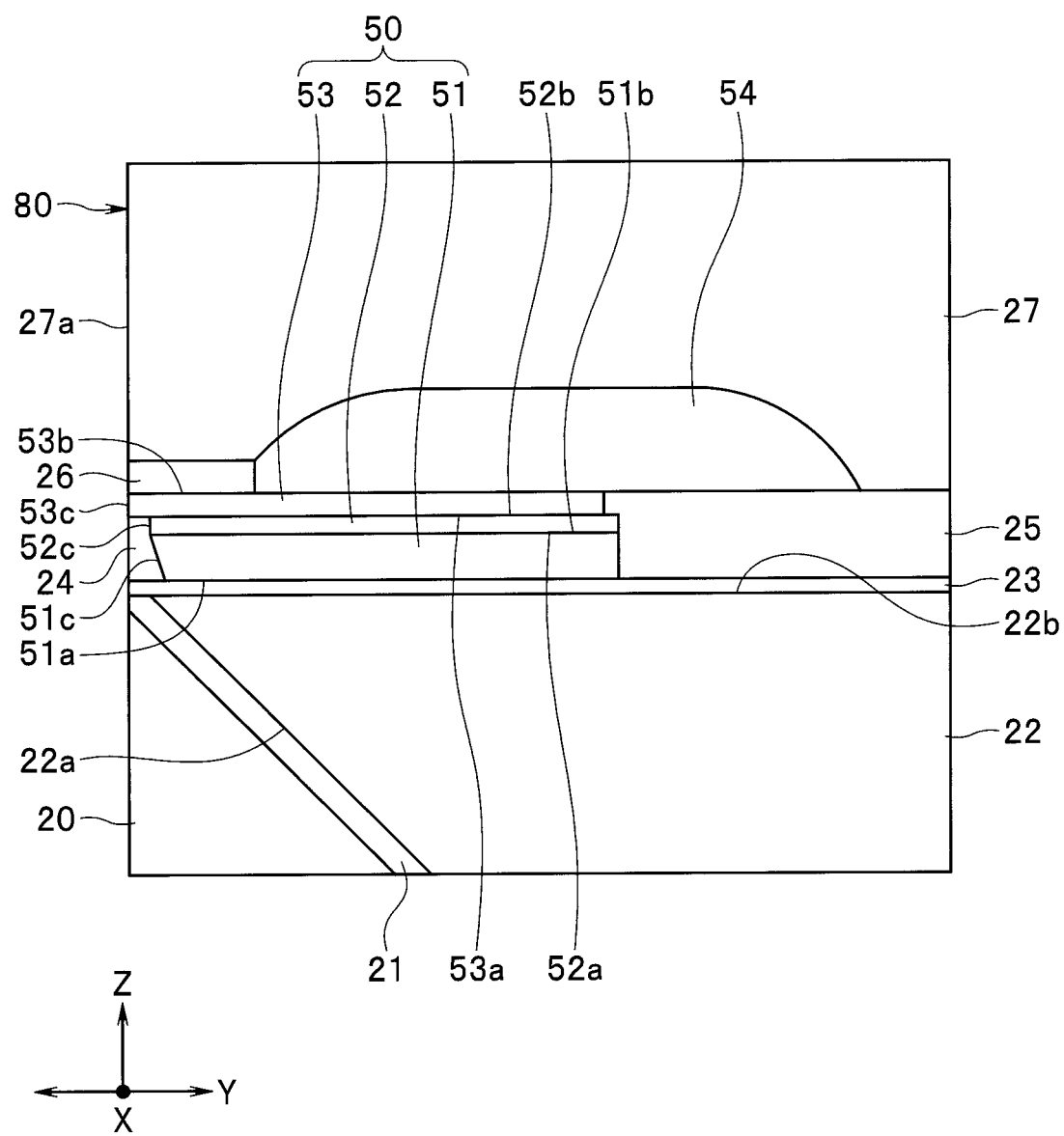
FIG. 20 is a cross-sectional view showing essential parts of a thermally-assisted magnetic recording head according to the second embodiment of the invention.

A second embodiment of the invention will now be described with reference to FIG. 18 to FIG. 20. FIG. 18 is a perspective view showing a plasmon generator of the present embodiment. FIG. 19 is a plan view showing the plasmon generator of the present embodiment. FIG. 20 is a cross-sectional view showing essential parts of a thermally-assisted magnetic recording head according to the present embodiment.

The thermally-assisted magnetic recording head 100 according to the present embodiment is configured differently than in the first embodiment in the following ways. In the present embodiment, the second metal layer 52 of the plasmon generator 50 includes a narrow portion 52A and a wide portion 52B. The shape and layout of the wide portion 52B are the same as those of the second metal layer 52 in the first embodiment. The narrow portion 52A is located between the medium facing surface 80 and the wide portion 52B at a distance from the medium facing surface 80. The narrow portion 52A has the second front end 52c of the second metal layer 52. The narrow portion 52A decreases in width in the track width direction (X direction) with decreasing distance to the medium facing surface 80.

In the present embodiment, the narrow portion 53A of the third metal layer 53 also decreases in width in the track width direction with decreasing distance to the medium facing surface 80. Here, the width in the track width direction will be referred to simply as a width. In an arbitrary cross section parallel to the medium facing surface 80, the width of the narrow portion 52A of the second metal layer 52 is greater than that of the narrow portion 53A of the third metal layer 53. The width of the narrow portion 52A at the position of the second front end 52c is in the range of 30 to 60 nm, for example. The width of the narrow portion 52A at the border position between the narrow portion 52A and the wide portion 52B is in the range of 40 to 80 nm, for example. The width of the narrow portion 53A in the medium facing surface 80 is in the range of 10 to 20 nm, for example. The width of the narrow portion 53A at the border position between the narrow portion 53A and the wide portion 53B is in the range of 55 to 65 nm, for example.

In the present embodiment, the distance NH1 between the medium facing surface 80 and the second front end 52c is in the range of 5 to 20 nm, for example. The distance NH2 between the medium facing surface 80 and the rear end 53d is in the range of 60 to 70 nm, for example. As shown in FIG. 19, the distance between the medium facing surface 80 and the wide portion 52B of the second metal layer 52 will be denoted by the symbol NH3. The distance NH3 is in the range of 30 to 40 nm, for example.

In the present embodiment, the first metal layer 51 includes a narrow portion 51A and a wide portion 51B. The wide portion 51B has the same or substantially the same planar shape as that of the wide portion 52B of the second metal layer 52. The narrow portion 51A is located between the medium facing surface 80 and the wide portion 51B at a distance from the medium facing surface 80. The narrow position 51A has the same or substantially the same planar shape as that of the narrow portion 52A of the second metal layer 52.

The narrow portion 51A includes the first front end 51c of the first metal layer 51. In the present embodiment, the first front end 51c is an inclined surface inclined relative to the medium facing surface 80.

In the present embodiment, the dielectric layer 24 is located between the medium facing surface 80 and the first front end 51c of the first metal layer 51 and between the medium facing surface 80 and the second front end 52c of the second metal layer 52. The dielectric layer 25 is located around the first metal layer 51, the second metal layer 52, and the dielectric layer 24.

In the present embodiment, surface plasmons excited on the plasmon exciting portion 51a of the first metal layer 51 are narrowed down as the surface plasmons propagate through the narrow portion 51A of the first metal layer 51 and the narrow portion 52A of the second metal layer 52. According to the present embodiment, spreading of the near-field light can thereby be suppressed.

A manufacturing method for the thermally-assisted magnetic recording head 100 according to the present embodiment will now be described with reference to FIG. 21 to FIG. 26. FIG. 21 to FIG. 26 each show a stack of layers formed in the process of manufacturing the thermally-assisted magnetic recording head 100. FIG. 21 to FIG. 26 omit the illustration of portions located below the cladding layer 23.

Figure 21:
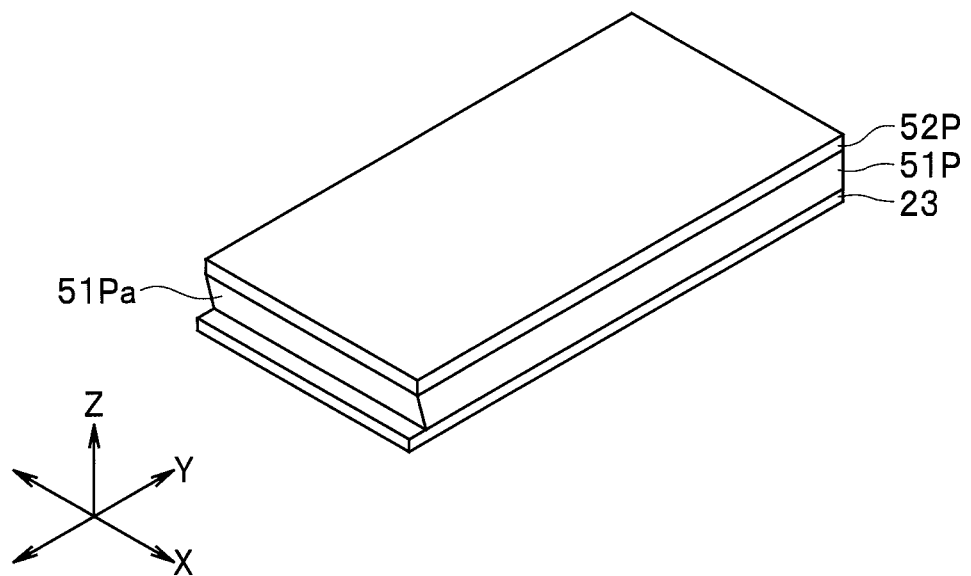
FIG. 21 is a perspective view showing a step of a manufacturing method for the thermally-assisted magnetic recording head according to the second embodiment of the invention.

The manufacturing method for the thermally-assisted magnetic recording head 100 according to the present embodiment is the same as that of the first embodiment up to the step of forming the first metal film for eventually making the first metal layer 51 and the second metal film for eventually making the second metal layer 52. The first metal film will hereinafter be denoted by the reference numeral 51P, and the second metal film by the reference numeral 52P. FIG. 21 shows the next step. In this step, an unshown mask is initially formed. Next, using the unshown mask, part of each of the first and second metal films 51P and 52P is etched by IBE, for example. This etching is performed to remove at least part of the first and second metal films 51P and 52P near the location where the medium facing surface 80 is to be formed. The etched first and second metal films 51P and 52P have a planar shape greater than that of the third metal layer 53 to be formed later.

In the step shown in FIG. 21, part of the first metal film 51P near the location where the medium facing surface 80 is to be formed is then etched so that an inclined surface inclined relative to the medium facing surface 80 is formed on the first metal film 51P. This etching is performed by IBE, for example. In the case of using IBE, the traveling direction of the ion beam is tilted relative to the top surface 1a of the substrate 1 (see FIGS. 5 and 6). The inclined surface formed on the first metal film 51P includes the first front end 51c of the first metal layer 51 to be eventually formed. Next, the mask is removed.

Figure 22:
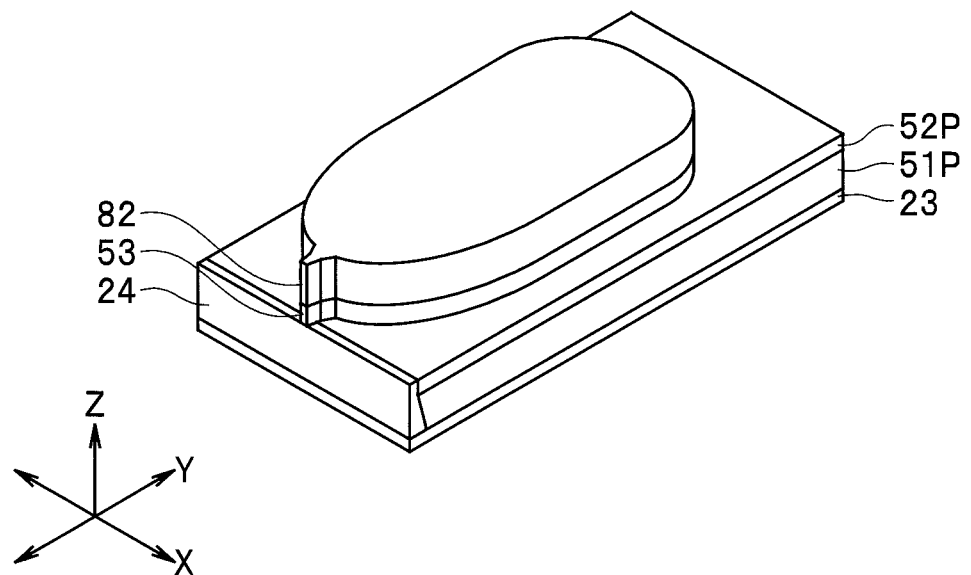
FIG. 22 is a perspective view showing a step that follows the step shown in FIG. 21.

FIG. 22 shows the next step. In this step, the dielectric layer 24 is initially formed on the entire top surface of the stack. Next, the dielectric layer 24 is polished by CMP, for example, until the second metal film 52p is exposed. Next, a metal film made of the second metal material is formed on the second metal layer 52 and the dielectric layer 24 by sputtering, for example. Next, a mask 82 for patterning the metal film is formed on the metal film. The mask 82 is formed of carbon, for example. The mask 82 includes a first portion and a second portion. The first portion has a planar shape corresponding to that of the narrow portion 53A of the third metal layer 53 to be eventually formed. The second portion has a planar shape corresponding to that of the wide portion 53B of the third metal layer 53 to be eventually formed. Next, using the mask 82, the metal film is etched by IBE, for example. This etching makes the metal film into the third metal layer 53.

Figure 23:
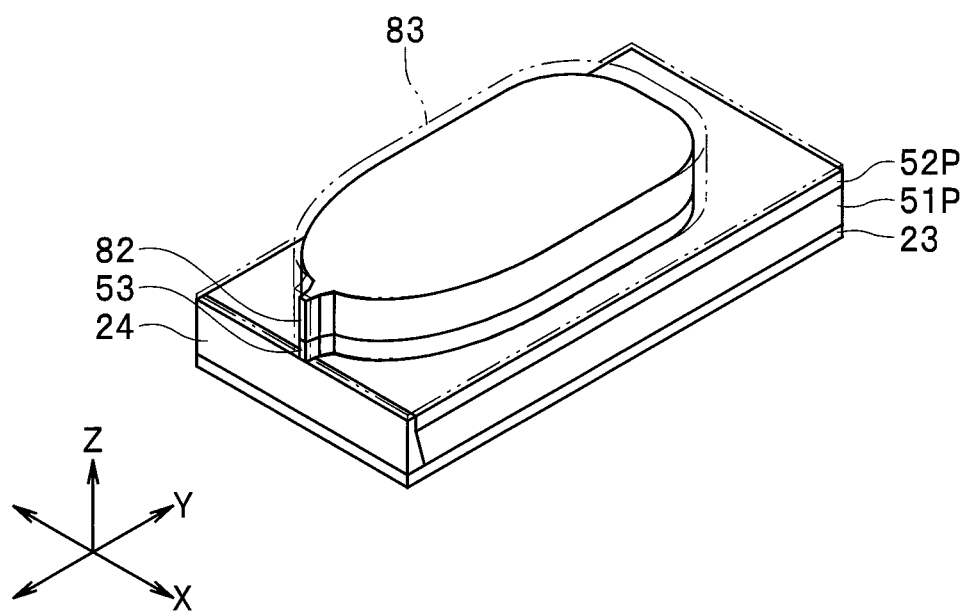
FIG. 23 is a perspective view showing a step that follows the step shown in FIG. 22.

FIG. 23 shows the next step. In this step, an insulating layer 83 of, e.g., alumina is formed over the entire top surface of the stack with the mask 82 left unremoved. The insulating layer 83 is formed by atomic layer deposition, for example. The insulating layer 83 has a thickness in the range of 10 to 30 nm, for example.

Figure 24:
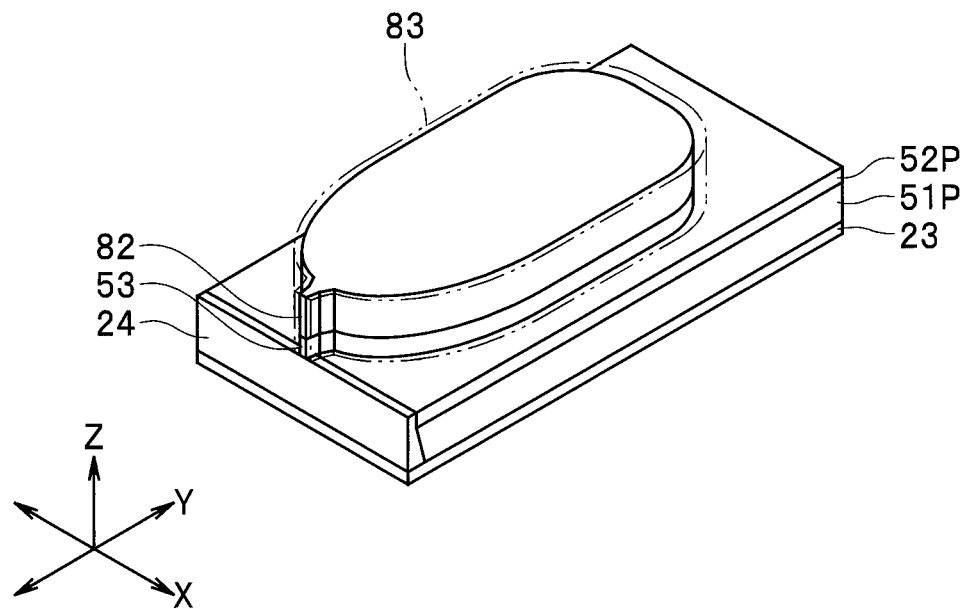
FIG. 24 is a perspective view showing a step that follows the step shown in FIG. 23.

FIG. 24 shows the next step. In this step, portions of the insulating layer 83 formed on the respective top surfaces of the second metal film 52P, the dielectric layer 24, and the mask 82 are removed by reactive ion etching, for example. The remaining portions of the insulating layer 83 left unetched cover the sides of the third metal layer 53 and the mask 82.

Figure 25:
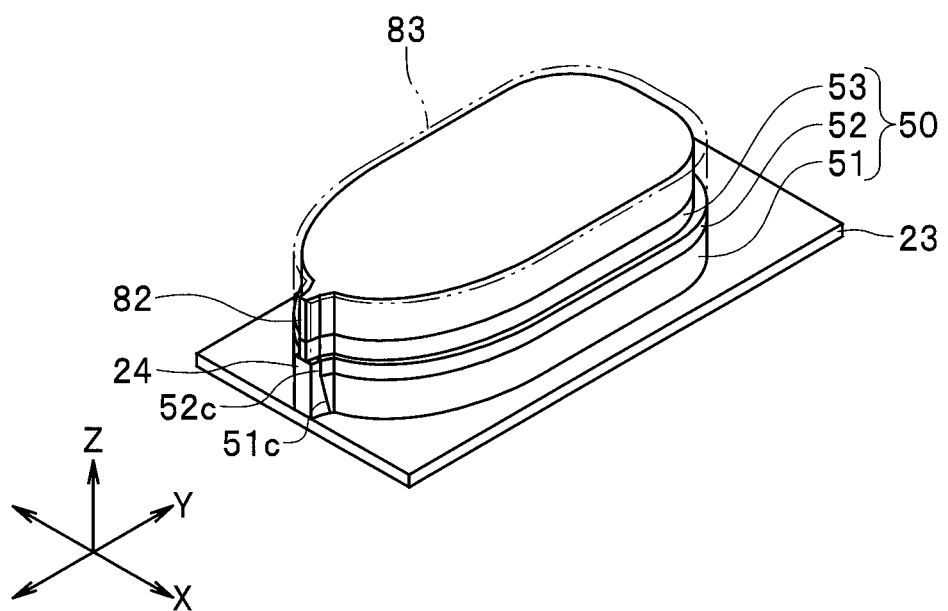
FIG. 25 is a perspective view showing a step that follows the step shown in FIG. 24.

FIG. 25 shows the next step. In this step, the first metal film 51P, the second metal film 52P, and the dielectric layer 24 are etched by IBE, for example, using the mask 82 and the insulating layer 83 as an etching mask. This etching makes the first metal film 51P into the first metal layer 51, and the second metal film 52P into the second metal layer 52.

Figure 26:
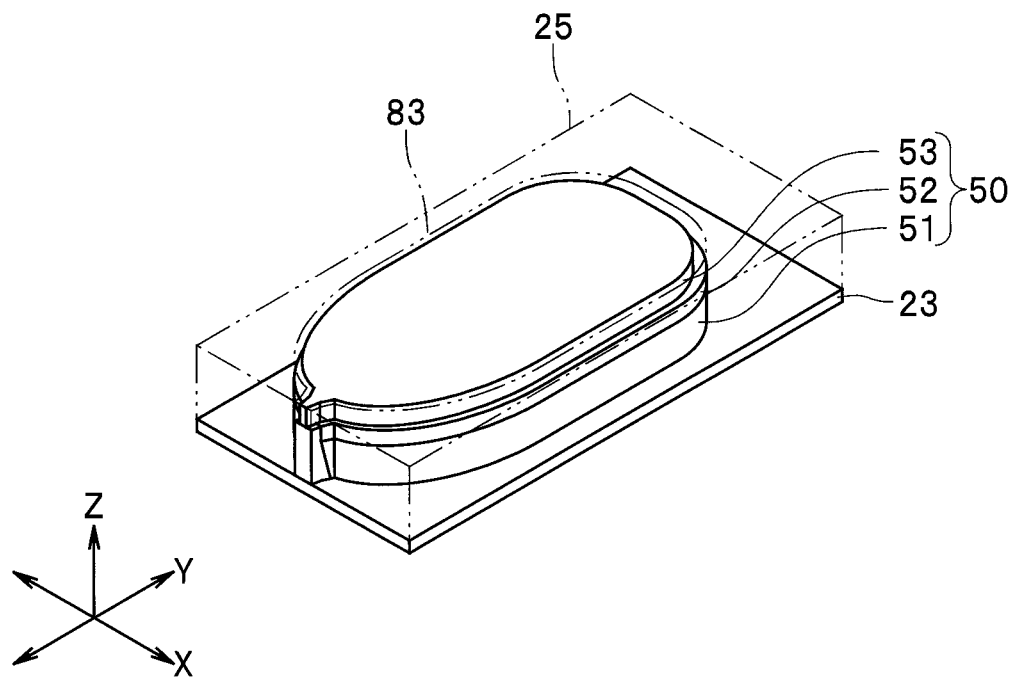
FIG. 26 is a perspective view showing a step that follows the step shown in FIG. 25.

FIG. 26 shows the next step. In this step, the dielectric layer 25 is initially formed over the entire top surface of the stack. Next, the dielectric layer 25, the mask 82, and the insulating layer 83 are polished by, for example, CMP until the third metal layer 53 is exposed. Next, the dielectric layer 26 is formed on the third metal layer 53 and the dielectric layer 25. The subsequent steps are the same as those of the first embodiment.

Modification Example

Figure 27:
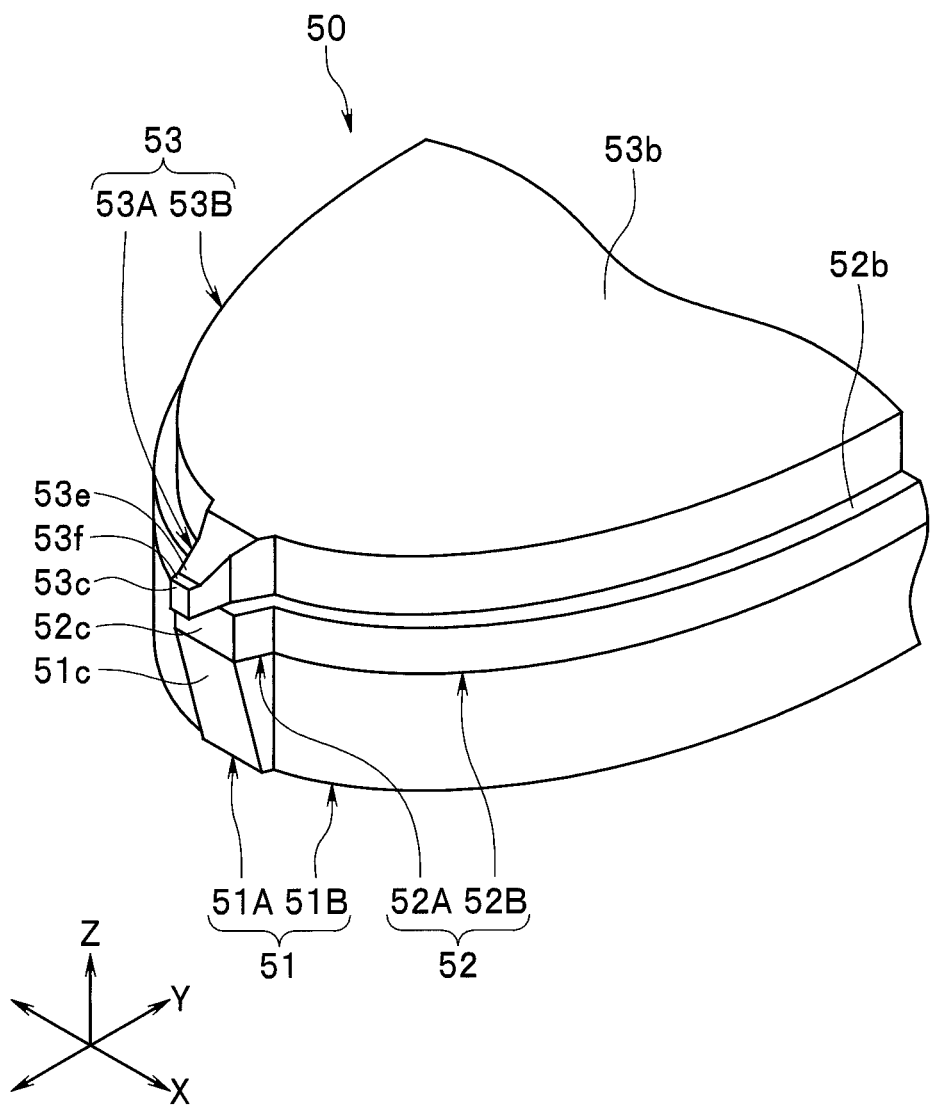
FIG. 27 is a perspective view showing a plasmon generator included in a modification example of the thermally-assisted magnetic recording head according to the second embodiment of the invention.
Figure 28:
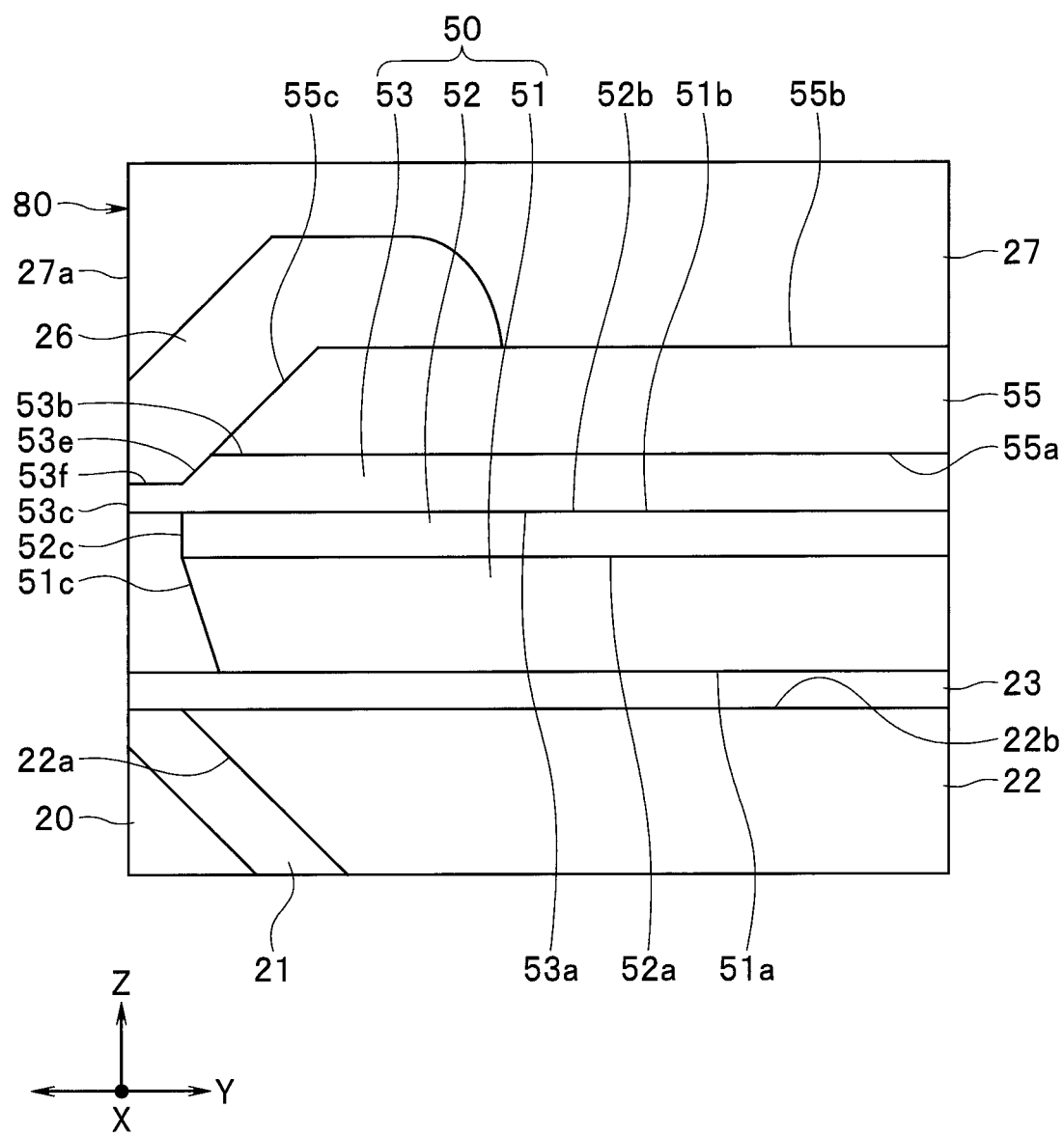
FIG. 28 is a cross-sectional view showing essential parts in the modification example of the thermally-assisted magnetic recording head according to the second embodiment of the invention.

A modification example of the thermally-assisted magnetic recording head 100 according to the present embodiment will now be described. FIG. 27 is a perspective view showing the plasmon generator 50 included in the modification example of the thermally-assisted magnetic recording head 100. FIG. 28 is a cross-sectional view showing essential parts in the modification example of the thermally-assisted magnetic recording head 100. In the modification example, the third metal layer 53 includes the inclined surface 53e and a flat surface 53f aside from the bottom surface 53a, the top surface 53b, and the front end face 53c. The inclined surface 53e is inclined relative to the direction perpendicular to the medium facing surface 80 (Y direction). The flat surface 53f extends in a direction substantially perpendicular to the medium facing surface 80. The flat surface 53f is connected to the front end face 53c. The inclined surface 53e connects the flat surface 53f and the top surface 53b.

The top surface of the narrow portion 53A of the third metal layer 53 includes an inclined portion constituting the inclined surface 53e and a flat portion constituting the flat surface 53f.

In the modification example, the thermally-assisted magnetic recording head 100 includes a heat sink 55 located on the plasmon generator 50 and the dielectric layer 25 at a distance from the medium facing surface 80, instead of the heat sink 54. The heat sink 55 is formed of the same material as that of the heat sink 54.

The heat sink 55 includes a bottom surface 55a in contact with the top surface 53b of the third metal layer 53, a top surface 55b opposite the bottom surface 55a, and a front end face 55c facing the medium facing surface 80. The front end face 55c is inclined relative to the direction perpendicular to the medium facing surface 80 to be continuous with the inclined surface 53e of the third metal layer 53.

In the modification example, the dielectric layer 26 also extends over the top surface 55b of the heat sink 55 to cover the inclined surface 53e and the flat surface 53f of the third metal layer 53 and the front end face 55c of the heat sink 55.

The remainder of configuration, function and effects of the present embodiment are similar to those of the first embodiment.

Third Embodiment

Figure 29:
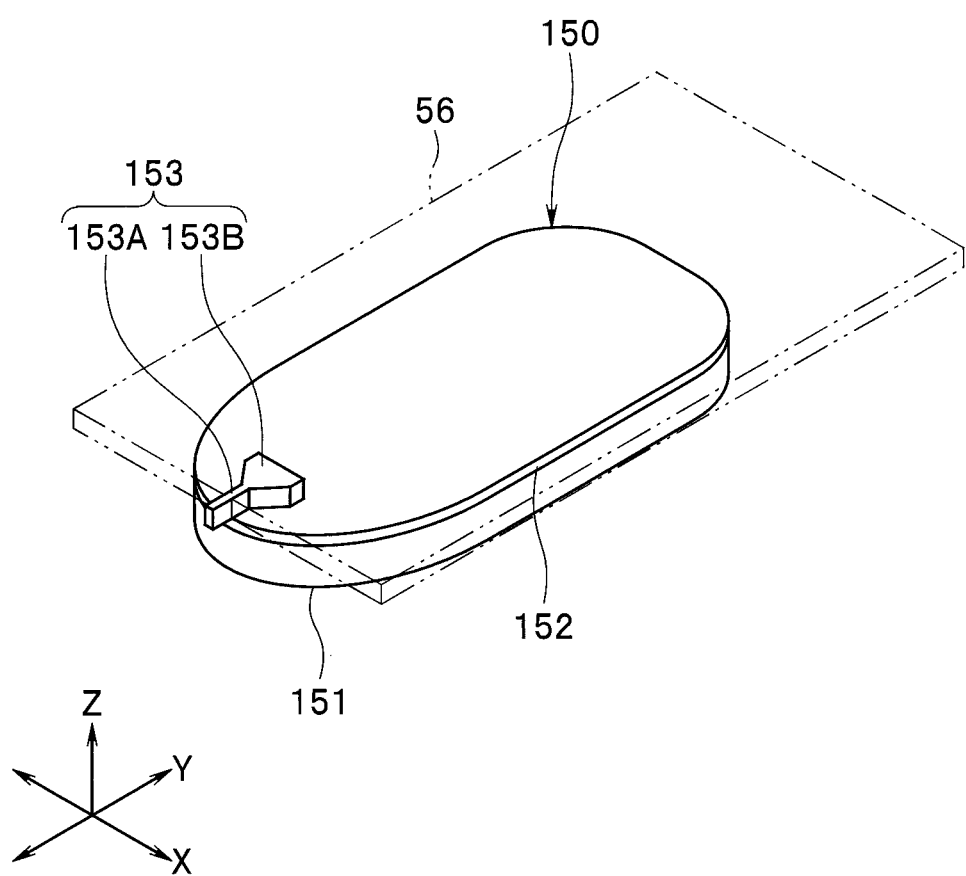
FIG. 29 is a perspective view showing a plasmon generator of a third embodiment of the invention.
Figure 30:
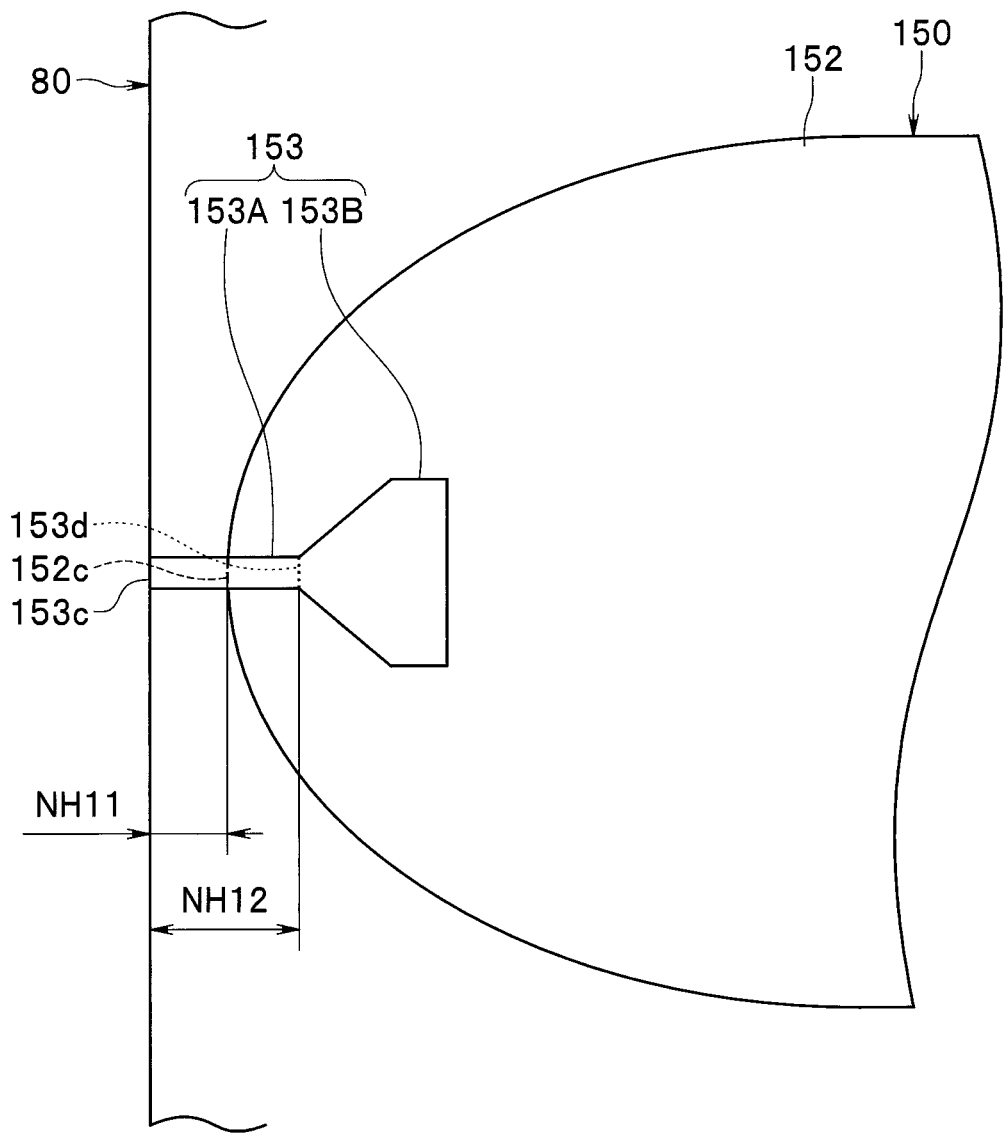
FIG. 30 is a plan view showing the plasmon generator of the third embodiment of the invention.
Figure 31:
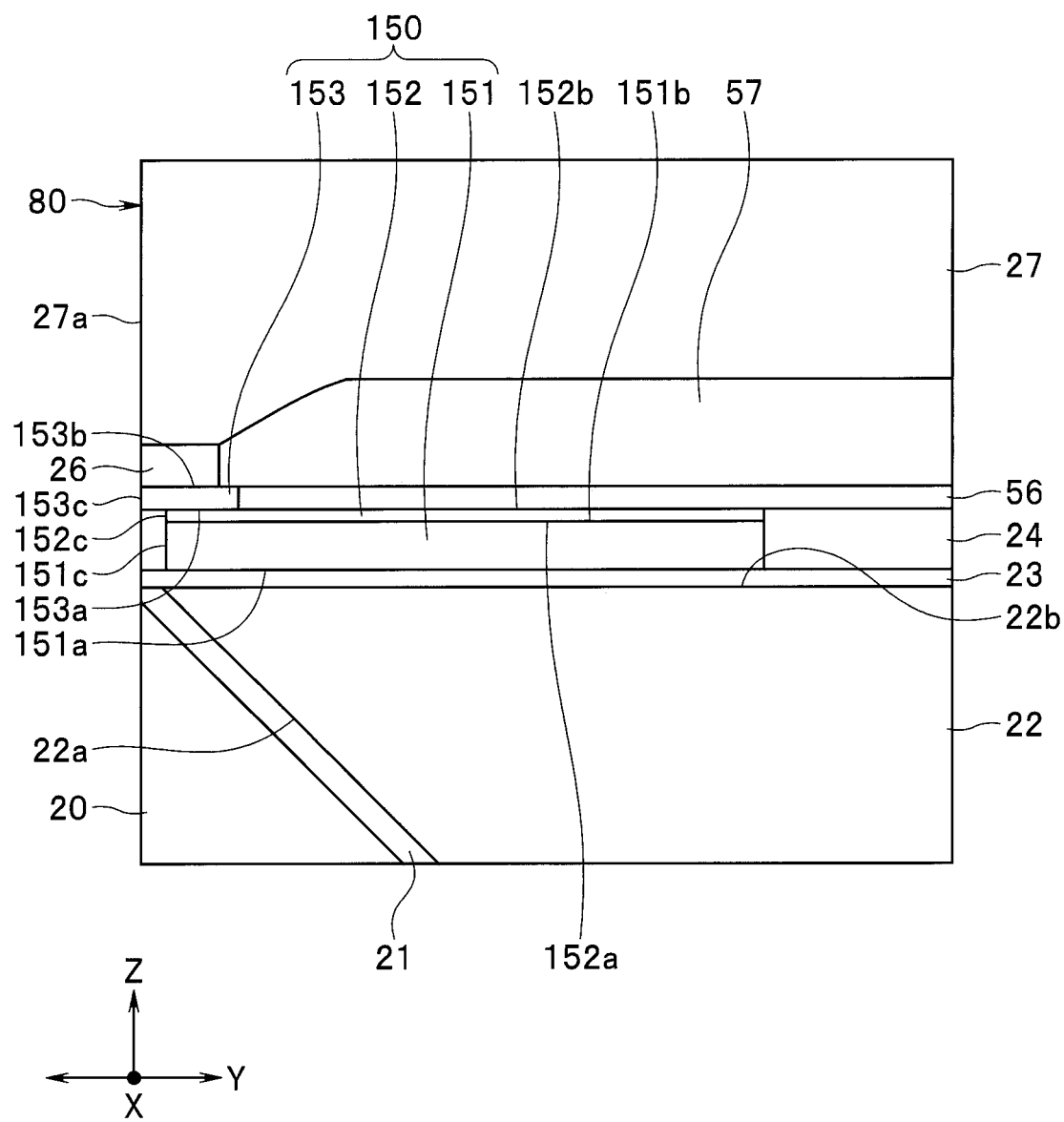
FIG. 31 is a cross-sectional view showing essential parts of a thermally-assisted magnetic recording head according to the third embodiment of the invention.

A third embodiment of the invention will now be described with reference to FIG. 29 to FIG. 31. FIG. 29 is a perspective view showing a plasmon generator of the present embodiment. FIG. 30 is a plan view showing the plasmon generator of the present embodiment. FIG. 31 is a cross-sectional view showing essential parts of a thermally-assisted magnetic recording head according to the present embodiment.

The thermally-assisted magnetic recording head 100 according to the present embodiment is configured differently than in the first embodiment in the following ways. The thermally-assisted magnetic recording head 100 according to the present embodiment includes a plasmon generator 150 instead of the plasmon generator 50 according to the first embodiment. The layout of the plasmon generator 150 is the same as that of the plasmon generator 50 according to the first embodiment.

The plasmon generator 150 includes a first metal layer 151, a second metal layer 152, and a third metal layer 153. The first metal layer 151 is formed of a first metal material. The second metal layer 152 and the third metal layer 153 are each formed of a second metal material.

The first metal layer 151 has the same or substantially the same planar shape as that of the first metal layer 51 according to the first embodiment. The first metal layer 151 includes a plasmon exciting portion 151a configured to excite surface plasmons thereon. The plasmon exciting portion 151a is located at a predetermined distance from the evanescent light generating surface 22b of the core 22 and faces the evanescent light generating surface 22b. The cladding layer 23 is interposed between the evanescent light generating surface 22b and the plasmon exciting portion 151a.

The plasmon exciting portion 151a is the bottom surface of the first metal layer 151. The first metal layer 151 further includes a top surface 151b and a first front end 151c that faces the medium facing surface 80. The first front end 151c is located away from the medium facing surface 80.

The second metal layer 152 has the same or substantially the same planar shape as that of the first metal layer 151. The second metal layer 152 includes a bottom surface 152a and a top surface 152b located on a side opposite the bottom surface 152a. The bottom surface 152a of the second metal layer 152 is in contact with the top surface 151b of the first metal layer 151.

The third metal layer 153 includes a bottom surface 153a and a top surface 153b located on a side opposite the bottom surface 153a. The bottom surface 153a of the third metal layer 153 is in contact with the top surface 152b of the second metal layer 152.

The third metal layer 153 further includes a front end face 153c that generates near-field light from surface plasmons. The front end face 153c is located in the medium facing surface 80.

The third metal layer 153 includes a narrow portion 153A and a wide portion 153B which is located farther from the medium facing surface 80 than is the narrow portion 153A. The narrow portion 153A has a constant width in the track width direction (X direction) regardless of the distance from the medium facing surface 80. The narrow portion 153A includes a front end face located in the medium facing surface 80. The front end face of the narrow portion 153A is also the front end face 153c of the third metal layer 153. The narrow portion 153A can thus be said to have the front end face 153c. The narrow portion 153A further includes a rear end 153d opposite the front end face 153c, a bottom surface in contact with the second metal layer 152, and a top surface opposite the bottom surface.

The wide portion 153B is connected to the rear end 153d of the narrow portion 153A. In FIG. 30, the border between the narrow portion 153A and the wide portion 153B is shown by a dotted line. The wide portion 153B has a maximum width greater than a maximum width of the narrow portion 153A in the track width direction (X direction). The width of the wide portion 153B in the track width direction gradually increases with increasing distance from the medium facing surface 80, and then becomes constant. The wide portion 153B includes a bottom surface in contact with the second metal layer 152, and a top surface opposite the bottom surface.

The second metal layer 152 includes a second front end 152c facing the medium facing surface 80. The second front end 152c is located away from the medium facing surface 80. The rear end 153d of the narrow portion 153A of the third metal layer 153 is located farther from the medium facing surface 80 than is the second front end 152c of the second metal layer 152.

As shown in FIG. 30, the distance between the medium facing surface 80 and the second front end 152c will be denoted by the symbol NH11. The distance NH11 is in the range of 10 to 40 nm, for example. In the present embodiment, the distance between the medium facing surface 80 and the first front end 151c may be the same as the distance NH11. As shown in FIG. 30, the distance between the medium facing surface 80 and the rear end 153d will be denoted by the symbol NH12. The distance NH12 is the same as the length of the narrow portion 153A in the direction perpendicular to the medium facing surface 80 (Y direction). The distance NH12 is greater than the distance NH11.

The width of the front end face 153c of the third metal layer 153 (dimension in the track width direction (X direction)) may be the same as that of the front end face 53c of the third metal layer 53 according to the first embodiment, for example. The height of the front end face 153c (dimension in the Z direction) may be the same as that of the front end face 53c according to the first embodiment, for example.

The first metal layer 151 may have the same thickness as that of the first metal layer 51 according to the first embodiment, for example. The second metal layer 152 may have the same thickness as that of the second metal layer 52 according to the first embodiment, for example. The third metal layer 153 may have the same thickness as that of the third metal layer 53 according to the first embodiment, for example.

The thermally-assisted magnetic recording head 100 according to the present embodiment includes heat sinks 56 and 57 instead of the heat sink 54 according to the first embodiment. The heat sinks 56 and 57 are each formed of the same material as that of the heat sink 54. The heat sink 56 is located on the second metal layer 152 and the dielectric layer 24, around the third metal layer 153. The heat sink 57 is located on the third metal layer 153 and the heat sink 56.

A manufacturing method for the thermally-assisted magnetic recording head 100 according to the present embodiment will now be described with reference to FIG. 32 to FIG. 36. FIG. 32 to FIG. 36 each show a stack of layers formed in the process of manufacturing the thermally-assisted magnetic recording head 100. FIG. 32 to FIG. 36 each show a cross section that intersects the front end face 27a of the main pole 27 and that is perpendicular to the medium facing surface 80 and to the top surface 1a of the substrate 1. In FIG. 32 to FIG. 36, the symbol ABS indicates the location at which the medium facing surface 80 is to be formed. FIG. 32 to FIG. 36 omit the illustration of portions located below the shield 20 and the core 22.

Figure 32:
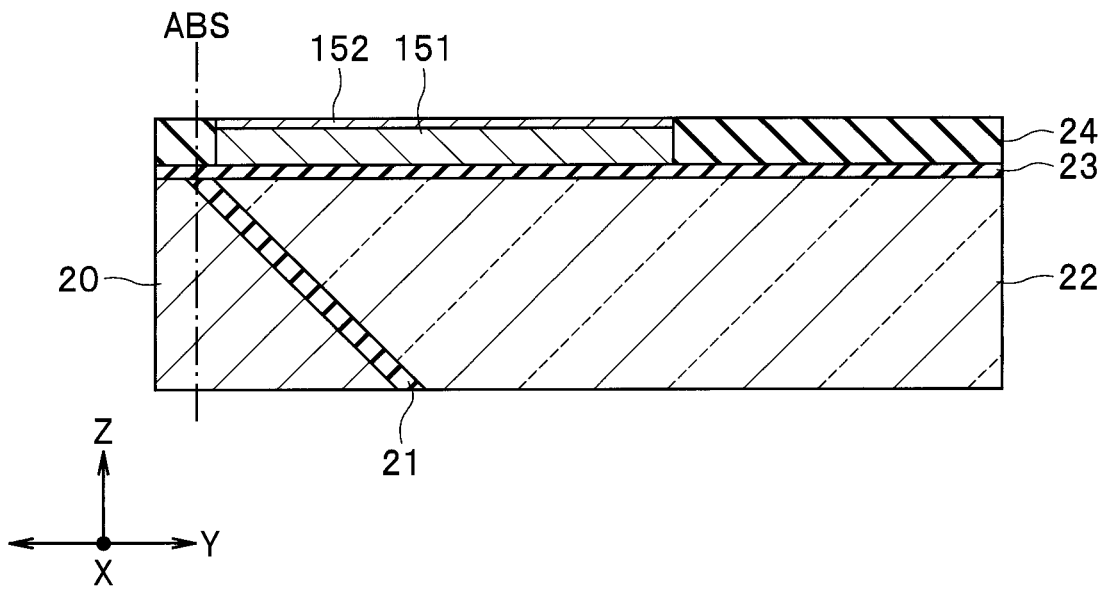
FIG. 32 is a cross-sectional view showing a step of a manufacturing method for the thermally-assisted magnetic recording head according to the third embodiment of the invention.

The manufacturing method for the thermally-assisted magnetic recording head 100 according to the present embodiment is the same as the method according to the first embodiment up to the step of forming the cladding layer 23. FIG. 32 shows the next step. In this step, the first and second metal layers 151 and 152 are initially formed using a mask, as in the step of forming the first and second metal layers 51 and 52 shown in FIGS. 7 and 8 according to the first embodiment. Next, the mask is removed. Next, the dielectric layer 24 is formed on the entire top surface of the stack. Next, the dielectric layer 24 is polished by CMP, for example, until the second metal layer 152 is exposed.

Figure 33:
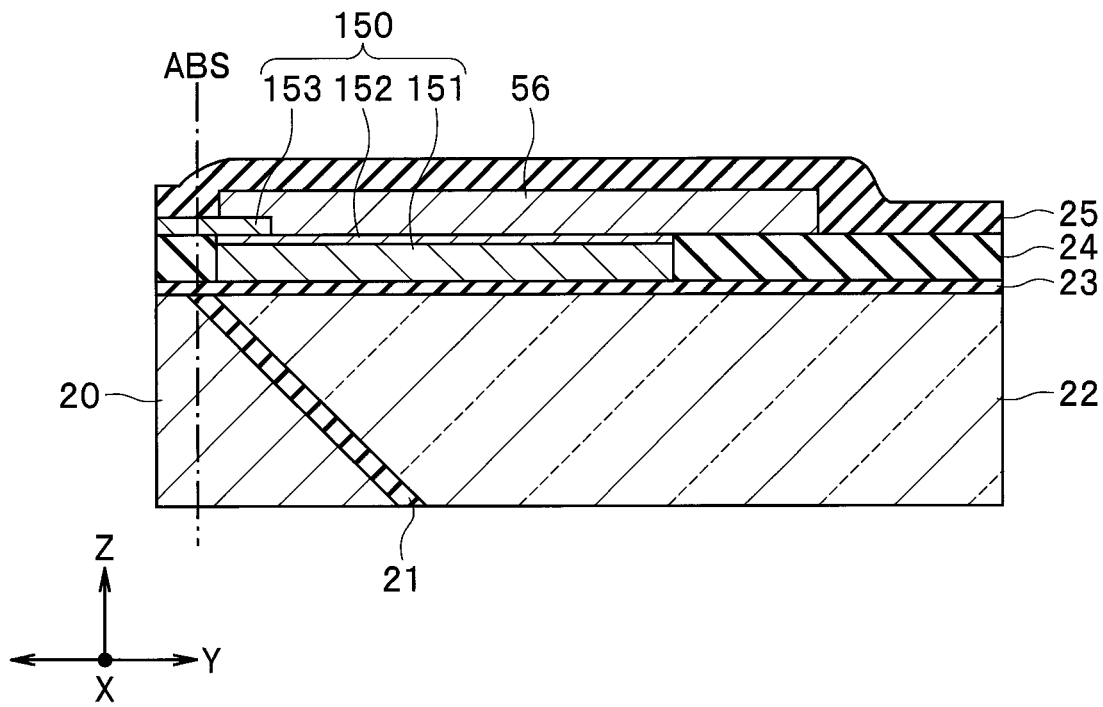
FIG. 33 is a cross-sectional view showing a step that follows the step shown in FIG. 32.

FIG. 33 shows the next step. In this step, the third metal layer 153 is initially formed as in the step of forming the third metal layer 53 shown in FIGS. 11 and 12 according to the first embodiment. Next, the heat sink 56 is formed on the second metal layer 152 and the dielectric layer 24. The heat sink 56 is formed to extend over the third metal layer 153. Next, the dielectric layer 25 is formed on the entire top surface of the stack.

Figure 34:
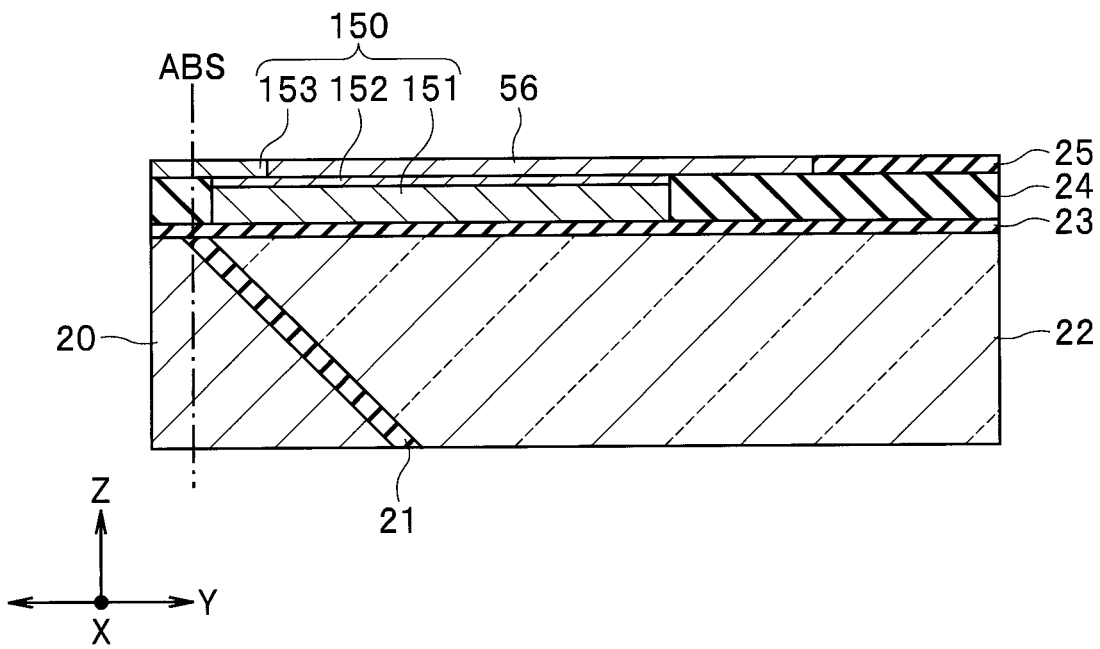
FIG. 34 is a cross-sectional view showing a step that follows the step shown in FIG. 33.

FIG. 34 shows the next step. In this step, the heat sink 56 and dielectric layer 25 are polished by CMP, for example, until the third metal layer 153 is exposed.

Figure 35:
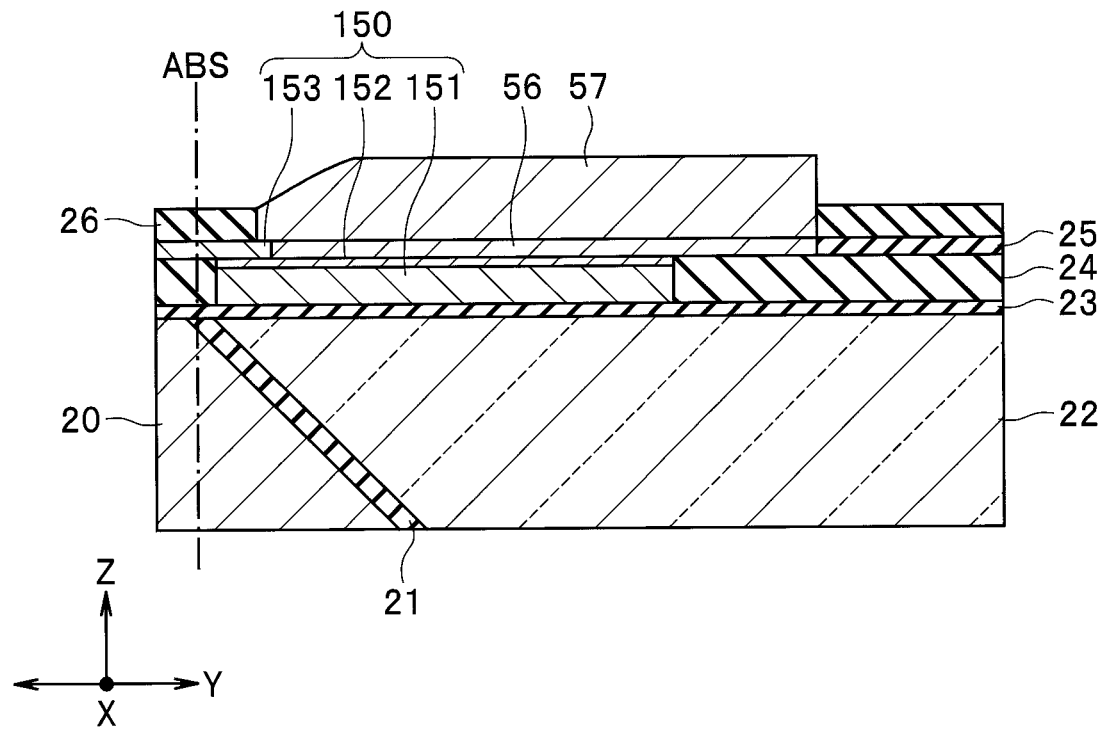
FIG. 35 is a cross-sectional view showing a step that follows the step shown in FIG. 34.

FIG. 35 shows the next step. In this step, the dielectric layer 26 is initially formed on the third metal layer 153, the heat sink 56, and the dielectric layer 25. Next, the heat sink 57 is formed as in the step of forming the heat sink 54 shown in FIGS. 13 and 14 according to the first embodiment.

Figure 36:
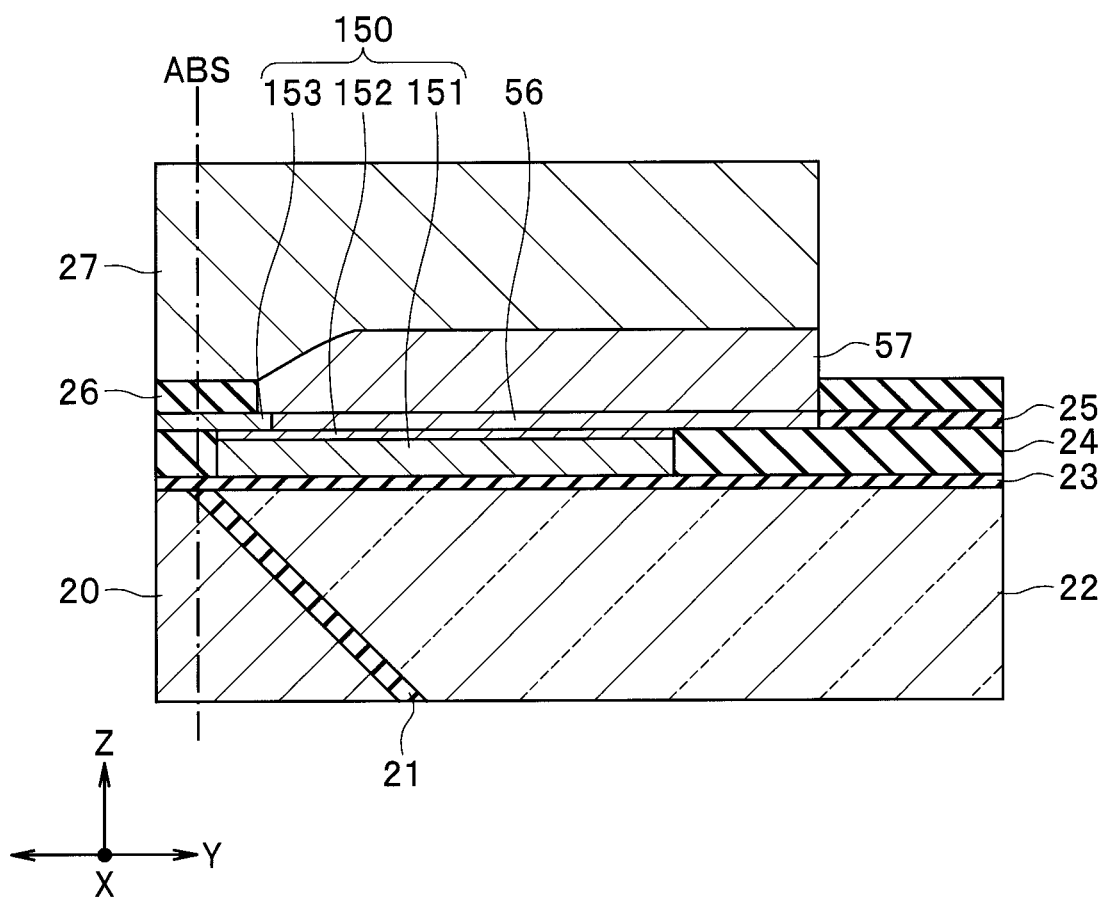
FIG. 36 is a cross-sectional view showing a step that follows the step shown in FIG. 35.

FIG. 36 shows the next step. In this step, the main pole 27 and the third layers of the respective coupling sections 18A and 18B are formed as in the step shown in FIG. 15 according to the first embodiment. The subsequent steps are the same as those of the first embodiment.

Modification Example

Figure 37:
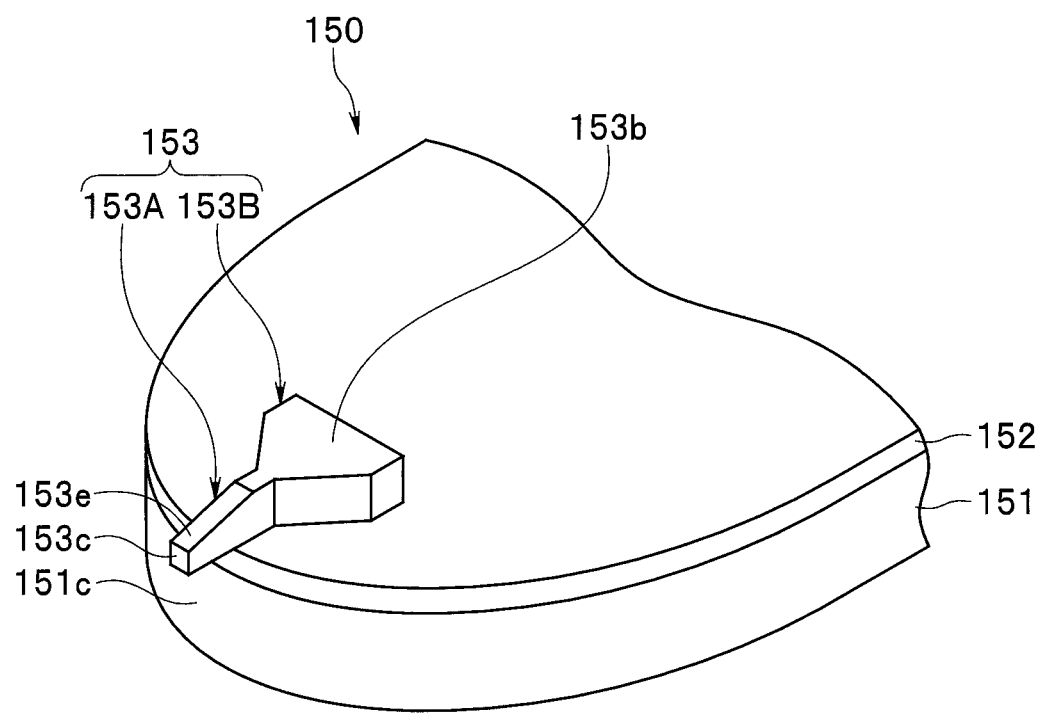
FIG. 37 is a perspective view of a plasmon generator included in a modification example of the thermally-assisted magnetic recording head according to the third embodiment of the invention.
Figure 37:
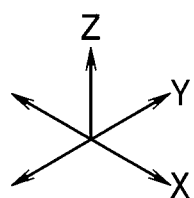

A modification example of the thermally-assisted magnetic recording head 100 according to the present embodiment will now be described. FIG. 37 is a perspective view showing the plasmon generator 150 included in the modification example of the thermally-assisted magnetic recording head 100. In the modification example, the third metal layer 153 includes an inclined surface 153e aside from the bottom surface 153a, the top surface 153b, and the front end face 153c. The inclined surface 153e is inclined relative to the direction perpendicular to the medium facing surface 80 (Y direction). The inclined surface 153e connects the top surface 153b and the front end face 153c.

The top surface of the narrow portion 153A of the third metal layer 153 includes an inclined portion constituting the inclined surface 153e. In the modification example, part of the top surface of the narrow portion 153A constitutes the inclined portion.

In the modification example, the inclined portion (inclined surface 153e) of the narrow portion 153A can reduce the thickness of the third metal layer 153 in the medium facing surface 80 while increasing the thickness of the third metal layer 153 at a position away from the medium facing surface 80 to increase the volume and heat capacity of the third metal layer 153.

The remainder of configuration, function and effects of the present embodiment are similar to those of the first embodiment.

Fourth Embodiment

Figure 38:
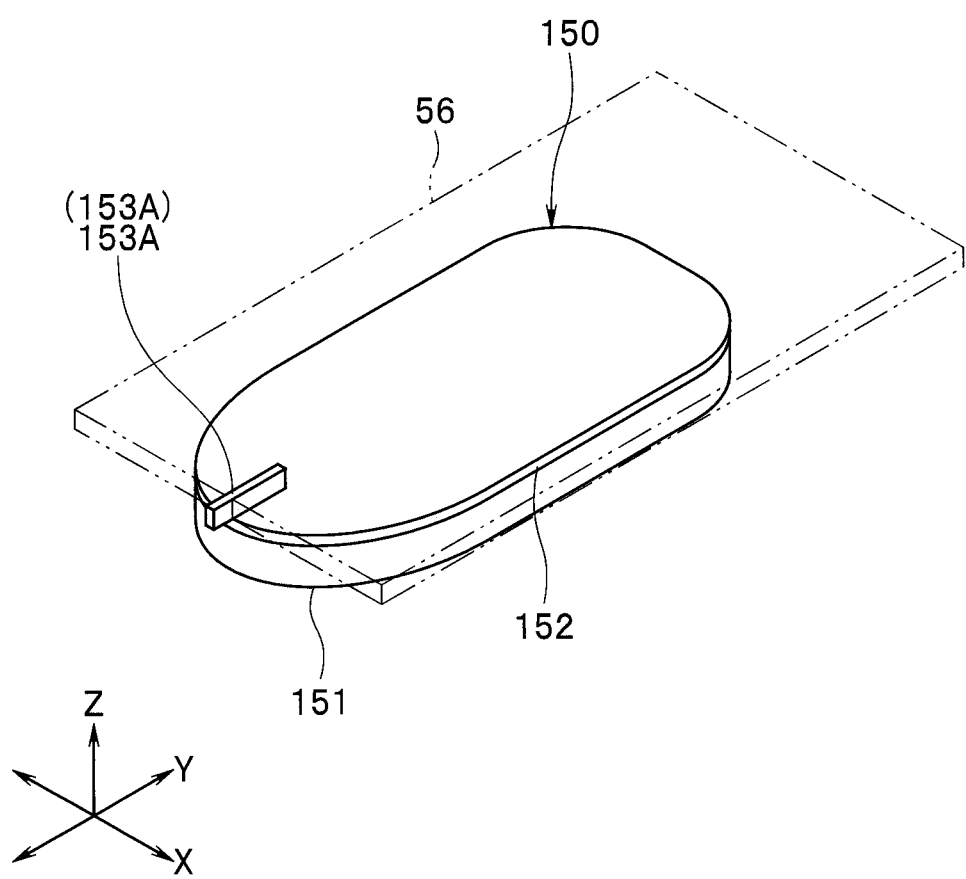
FIG. 38 is a perspective view showing a plasmon generator of a fourth embodiment of the invention.
Figure 39:
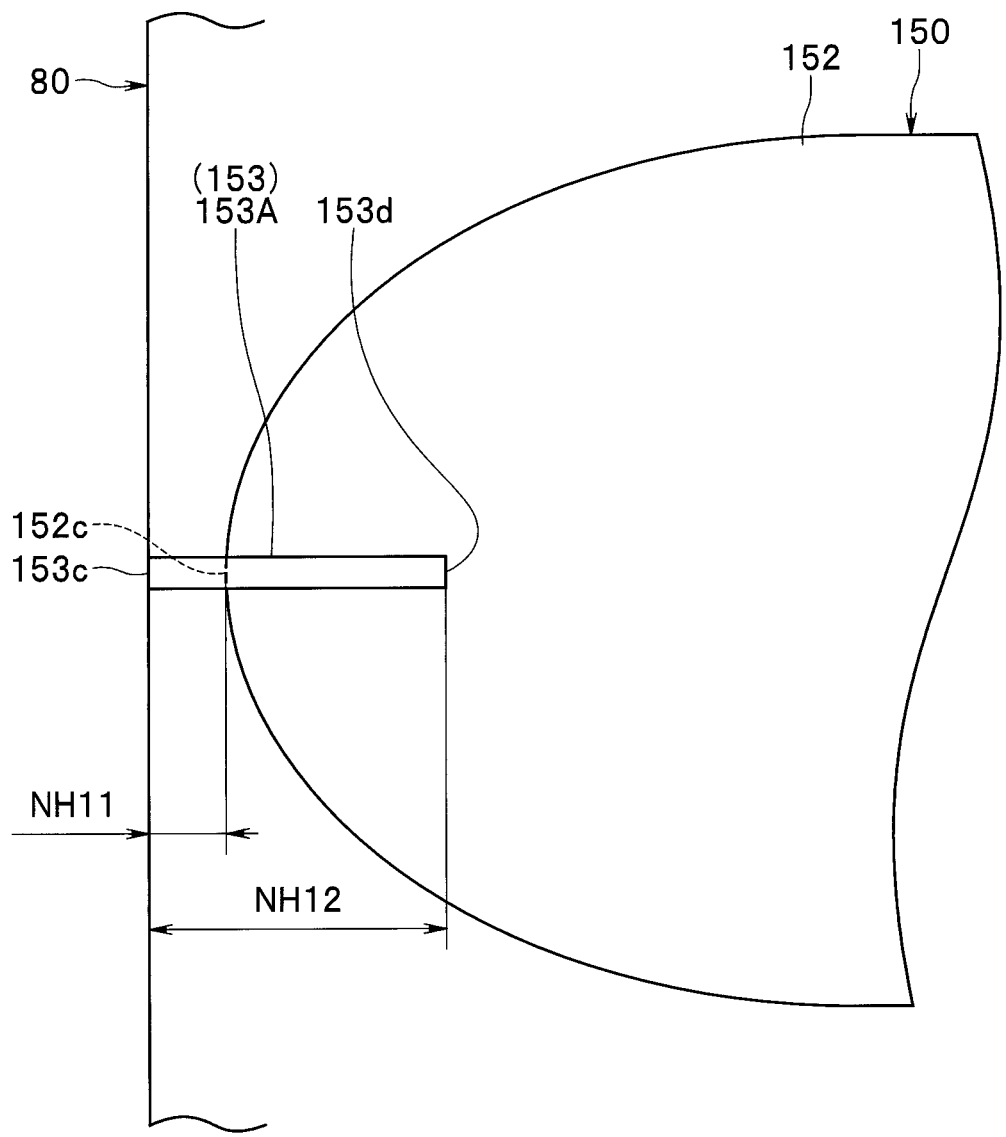
FIG. 39 is a plan view showing the plasmon generator of the fourth embodiment of the invention.

A fourth embodiment of the invention will now be described with reference to FIG. 38 and FIG. 39. FIG. 38 is a perspective view showing a plasmon generator of the present embodiment. FIG. 39 is a plan view showing a plasmon generator of the present embodiment.

The thermally-assisted magnetic recording head 100 according to the present embodiment is configured differently than in the third embodiment in the following ways. In the present embodiment, the third metal layer 153 of the plasmon generator 150 does not include the wide portion 153B according to the third embodiment. In other words, in the present embodiment, the entire third metal layer 153 is the narrow portion 153A. The distance NH12 between the medium facing surface 80 and the rear end 153d of the narrow portion 153A, i.e., the length of the narrow portion 153A in the direction perpendicular to the medium facing surface 80 (Y direction) may be greater than in the third embodiment.

The remainder of configuration, function and effects of the present embodiment are similar to those of the third embodiment.

The present invention is not limited to the foregoing embodiments, and various modifications may be made thereto. For example, the shapes and configurations of the plasmon generators 50 and 150 and the heat sinks 54 to 57 are not limited to the examples described in the embodiments, and may be freely set as far as the requirements set forth in the claims are satisfied.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A thermally-assisted magnetic recording head comprising:
    a medium facing surface configured to face a recording medium;
    a main pole configured to produce a write magnetic field for writing data on the recording medium;
    a waveguide including a core configured to allow light to propagate therethrough and a cladding arranged around the core; and
    a plasmon generator, wherein
    the plasmon generator includes a first metal layer, a second metal layer, and a third metal layer,
    the first metal layer is formed of a first metal material, is located away from the medium facing surface, and includes a plasmon exciting portion configured to excite a surface plasmon thereon based on the light propagating through the core and a first front end facing the medium facing surface,
    the second metal layer is formed of a second metal material, is located on the first metal layer at a distance from the medium facing surface, and includes a second front end facing the medium facing surface,
    the third metal layer is formed of the second metal material and located on the second metal layer,
    the third metal layer includes a narrow portion located on the second metal layer, the narrow portion including a front end face that is located in the medium facing surface, and a rear end opposite the front end face, the front end face being configured to generate near-field light from the surface plasmon,
    the second metal layer has a maximum width greater than that of the narrow portion of the third metal layer in a track width direction, and the rear end of the narrow portion of the third metal layer is located farther from the medium facing surface than is the second front end of the second metal layer.

2. The thermally-assisted magnetic recording head according to claim 1, wherein
the first metal material contains Au, and
the second metal material is Pt, Rh, Ir, a PtAu alloy, a PtRh alloy, an RhAu alloy, or a PtIr alloy.

3. The thermally-assisted magnetic recording head according to claim 1, wherein
the second metal layer includes a first wide portion,
the third metal layer further includes a second wide portion located on the first wide portion of the second metal layer at a position farther from the medium facing surface than is the narrow portion of the third metal layer,
the second wide portion of the third metal layer is connected to the rear end of the narrow portion of the third metal layer and has a maximum width greater than that of the narrow portion of the third metal layer in the track width direction, and
an outer edge of a planar shape of the second wide portion of the third metal layer is located along an outer edge of a planar shape of the first wide portion of the second metal layer.

4. The thermally-assisted magnetic recording head according to claim 1, wherein
the narrow portion of the third metal layer is a first narrow portion of the third metal layer,
the second metal layer includes a wide portion and a second narrow portion located between the medium facing surface and the wide portion at a distance from the medium facing surface,
the second narrow portion includes a second front end, and
in an arbitrary cross section parallel to the medium facing surface, a width of the second narrow portion of the second metal layer in the track width direction is greater than that of the first narrow portion of the third metal layer in the track width direction.

5. The thermally-assisted magnetic recording head according to claim 1, wherein at least part of the first front end of the first metal layer is located farther from the medium facing surface than is the second front end of the second metal layer.

6. The thermally-assisted magnetic recording head according to claim 5, wherein
the second metal layer includes a first wide portion,
the third metal layer further includes a second wide portion located on the first wide portion of the second metal layer at a position farther from the medium facing surface than is the narrow portion of the third metal layer,
the second wide portion of the third metal layer is connected to the rear end of the narrow portion of the third metal layer and has a maximum width greater than that of the narrow portion of the third metal layer in the track width direction, and
an outer edge of a planar shape of the second wide portion of the third metal layer is located along an outer edge of a planar shape of the first wide portion of the second metal layer.

7. The thermally-assisted magnetic recording head according to claim 5, wherein
the narrow portion of the third metal layer is a first narrow portion of the third metal layer,
the second metal layer includes a wide portion and a second narrow portion located between the medium facing surface and the wide portion at a distance from the medium facing surface,
the second narrow portion includes a second front end, and
in an arbitrary cross section parallel to the medium facing surface, a width of the second narrow portion of the second metal layer in the track width direction is greater than that of the first narrow portion of the third metal layer in the track width direction.

8. The thermally-assisted magnetic recording head according to claim 1, wherein
the narrow portion of the third metal layer further includes a bottom surface in contact with the second metal layer and a top surface opposite the bottom surface, and
the top surface includes an inclined portion inclined relative to a direction perpendicular to the medium facing surface.

9. The thermally-assisted magnetic recording head according to claim 1, wherein at least part of the narrow portion of the third metal layer has a constant width in the track width direction regardless of distance from the medium facing surface.

10. The thermally-assisted magnetic recording head according to claim 1, wherein a width of at least part of the narrow portion of the third metal layer in the track width direction decreases with decreasing distance to the medium facing surface.

11. A manufacturing method for a thermally-assisted magnetic recording head,
the thermally-assisted magnetic recording head including:
a medium facing surface configured to face a recording medium;
a main pole configured to produce a write magnetic field for writing data on the recording medium;
a waveguide including a core configured to allow light to propagate therethrough and a cladding arranged around the core; and
a plasmon generator,
the plasmon generator including a first metal layer, a second metal layer, and a third metal layer,
the first metal layer being formed of a first metal material, the first metal layer being located away from the medium facing surface, the first metal layer including a plasmon exciting portion configured to excite a surface plasmon thereon based on the light propagating through the core and a first front end facing the medium facing surface,
the second metal layer being formed of a second metal material, the second metal layer being located on the first metal layer at a distance from the medium facing surface, the second metal layer including a second front end facing the medium facing surface,
the third metal layer being formed of the second metal material and located on the second metal layer,
the third metal layer including a narrow portion located on the second metal layer, the narrow portion including a front end face that is located in the medium facing surface, and a rear end opposite the front end face, the front end face being configured to generate near-field light from the surface plasmon,
the second metal layer having a maximum width greater than that of the narrow portion of the third metal layer in a track width direction, the rear end of the narrow portion of the third metal layer being located farther from the medium facing surface than is the second front end of the second metal layer, and at least part of the first front end of the first metal layer being located farther from the medium facing surface than is the second front end of the second metal layer, the manufacturing method comprising:

a step of forming the main pole;

a step of forming the waveguide; and a step of forming the plasmon generator, wherein the step of forming the plasmon generator includes a step of forming the first metal layer and the second metal layer, and a step of forming the third metal layer, and the step of forming the first metal layer and the second metal layer includes a step of forming a first metal film of the first metal material, a step of forming a second metal film of the second metal material on the first metal film, a first etching step of etching part of the first metal film near a location where the medium facing surface is to be formed, after the formation of the second metal film, and a second etching step of etching the first metal film and the second metal film so that the first metal film and the second metal film make the first metal layer and the second metal layer, respectively.

12. The manufacturing method for a thermally-assisted magnetic recording head according to claim 11, wherein an outer edge of a planar shape of the second metal layer is located along an outer edge of a planar shape of the first metal layer.

13. The manufacturing method for a thermally-assisted magnetic recording head according to claim 11, wherein the step of forming the third metal layer is performed after the first etching step and before the second etching step.

14. The manufacturing method for a thermally-assisted magnetic recording head according to claim 11, wherein the second metal layer includes a first wide portion, the third metal layer further includes a second wide portion located on the first wide portion of the second metal layer at a position farther from the medium facing surface than is the narrow portion of the third metal layer, the second wide portion of the third metal layer is connected to the rear end of the narrow portion of the third metal layer and has a maximum width greater than that of the narrow portion of the third metal layer in the track width direction, and an outer edge of a planar shape of the second wide portion of the third metal layer is located along an outer edge of a planar shape of the first wide portion of the second metal layer.

15. The manufacturing method for a thermally-assisted magnetic recording head according to claim 11, wherein the narrow portion of the third metal layer is a first narrow portion of the third metal layer, the second metal layer includes a wide portion and a second narrow portion located between the medium facing surface and the wide portion at a distance from the medium facing surface, the second narrow portion includes a second front end, and in an arbitrary cross section parallel to the medium facing surface, a width of the second narrow portion of the second metal layer in the track width direction is greater than a width of the first narrow portion of the third metal layer in the track width direction.

* * * * *